(12) United States Patent
Sakano et al.

(10) Patent No.: US 7,129,621 B2
(45) Date of Patent: Oct. 31, 2006

(54) VIBRATION WAVE LINEAR MOTOR AND LENS IMPLEMENT USING VIBRATION WAVE LINEAR MOTOR

(75) Inventors: Hiromichi Sakano, Tokyo (JP); Yasuo Sasaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/201,848

(22) Filed: Aug. 11, 2005

(65) Prior Publication Data
US 2006/0043824 A1 Mar. 2, 2006

(30) Foreign Application Priority Data
Aug. 27, 2004 (JP) ............... 2004-247962

(51) Int. Cl.
*H01L 41/08* (2006.01)
*H02N 2/04* (2006.01)
(52) U.S. Cl. ............... 310/323.09; 310/323.01; 310/323.02; 310/323.03; 310/323.04; 396/75; 396/85; 396/113
(58) Field of Classification Search ............... 310/328, 310/323.17, 323.01–323.04, 323.09; 396/75, 396/85, 113
See application file for complete search history.

(56) References Cited

U.S. PATENT DOCUMENTS
5,136,200 A * 8/1992 Takizawa et al. ...... 310/323.16

FOREIGN PATENT DOCUMENTS
JP 09051687 A * 2/1997

* cited by examiner

*Primary Examiner*—Darren Schuberg
*Assistant Examiner*—J. Aguirrechea
(74) *Attorney, Agent, or Firm*—Scully, Scott, Murphy & Presser PC

(57) ABSTRACT

The vibration wave linear motor of the present invention is structured comprising a driven component, a first vibrator having two or more driving contacting parts for driving the driven component in a certain predetermined direction, a second vibrator having one or more driving contacting parts for driving the driven component in the same direction as the drive by the first vibrator, a first supporting part for fixing and holding either one of the first or second vibrators, a second supporting part for holding the other of either the first or second vibrator such that swinging is possible, and a pressing component for pressing the first or second vibrator which is held by the second supporting part, such as to enable swinging, to the driven component.

13 Claims, 16 Drawing Sheets

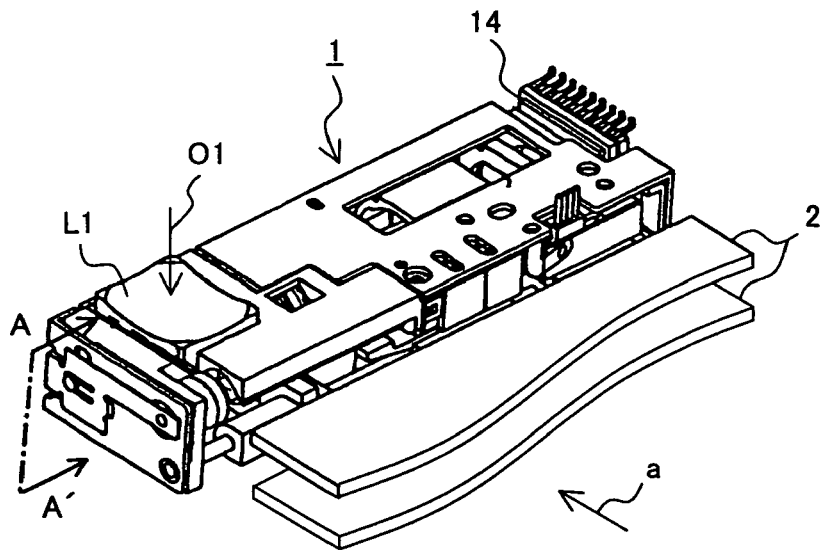
F I G. 1 A
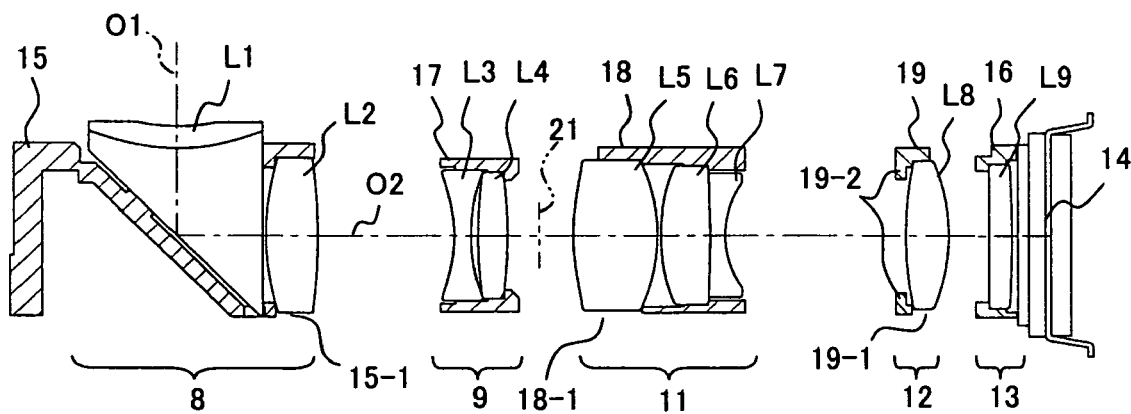
F I G. 1 B

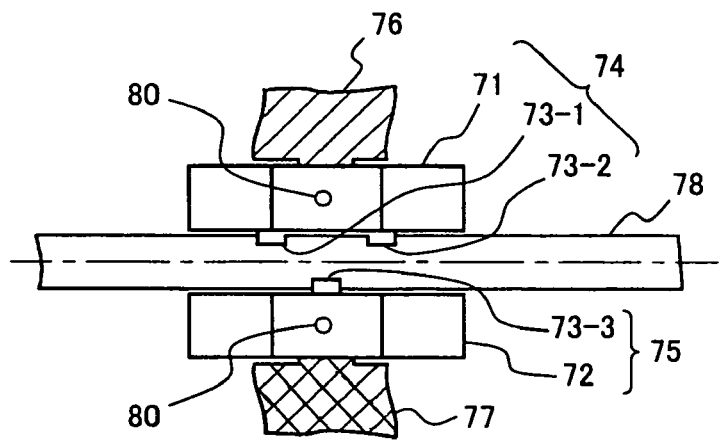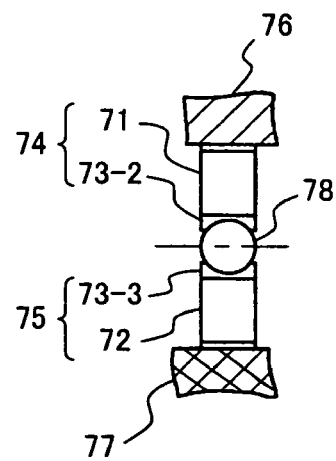
FIG. 4A  FIG. 4B
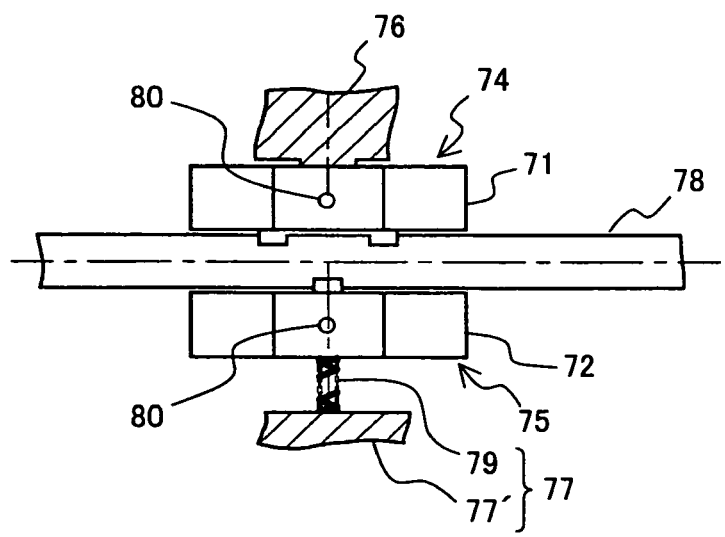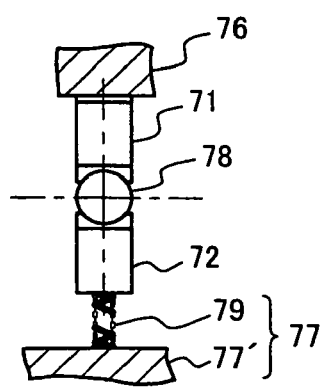
FIG. 4C  FIG. 4D

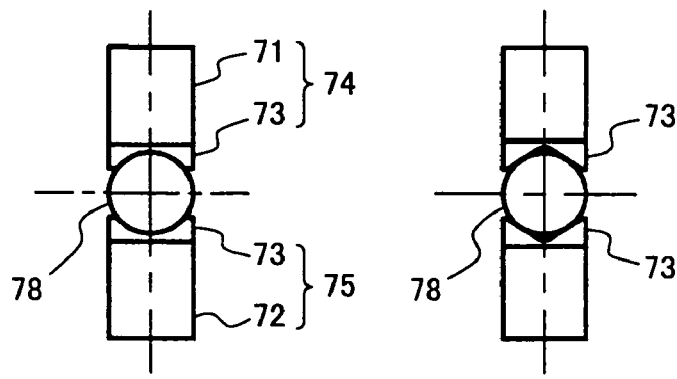
F I G. 5 A    F I G. 5 B
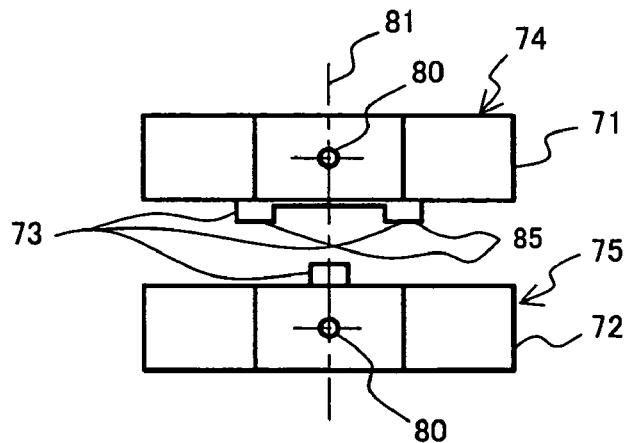
F I G. 5 C
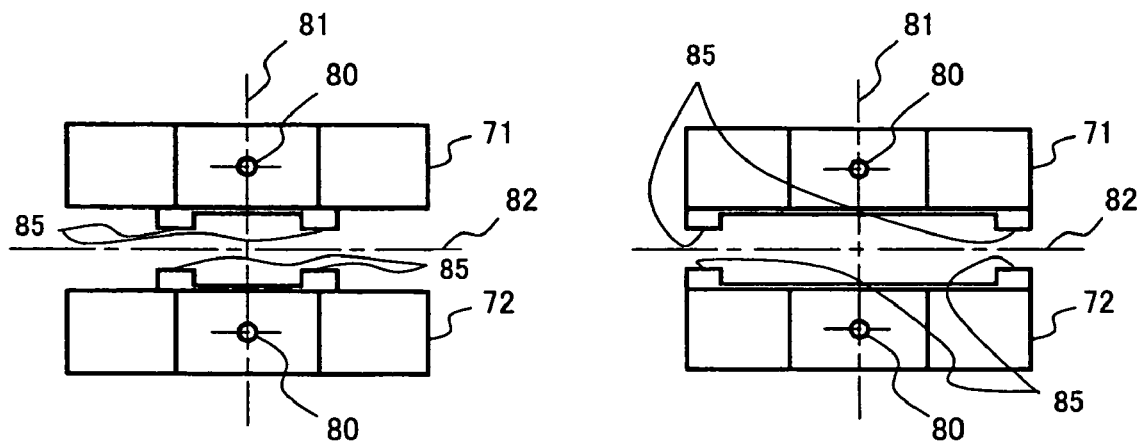
F I G. 5 D    F I G. 5 E

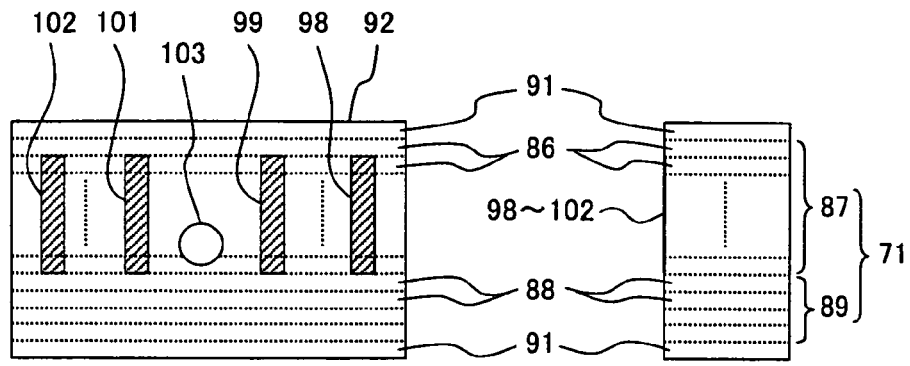
F I G. 6 A   F I G. 6 B
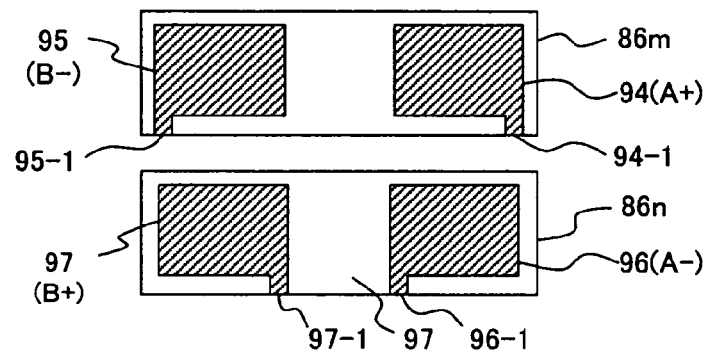
F I G. 6 C
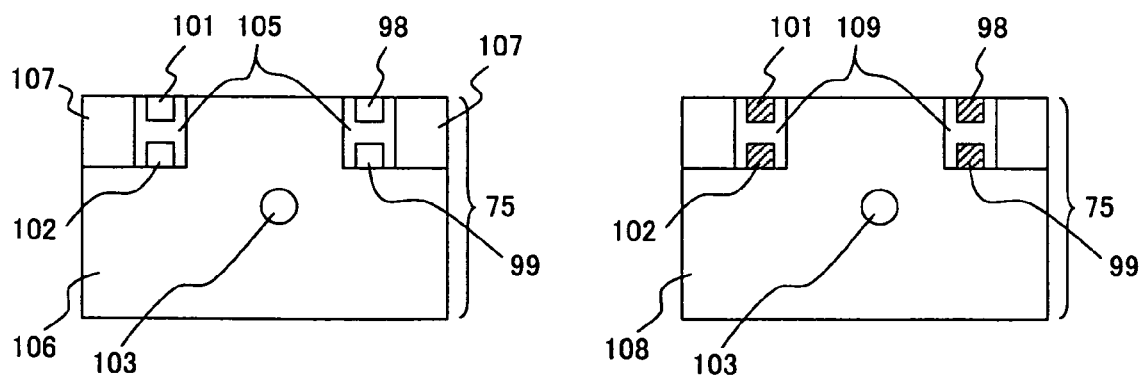
F I G. 6 D   F I G. 6 E

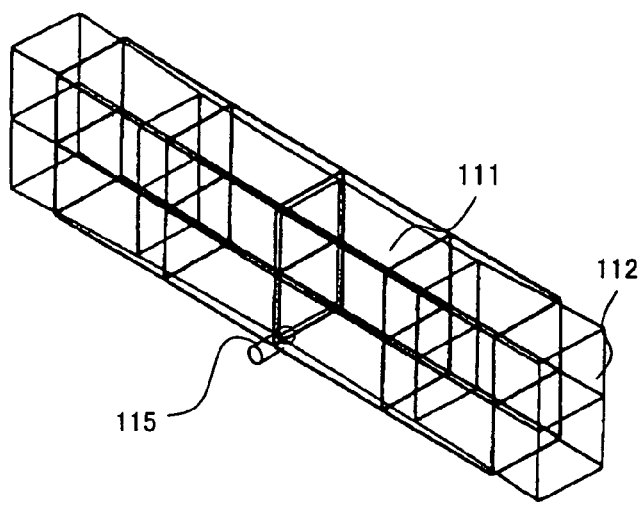
F I G. 7 A
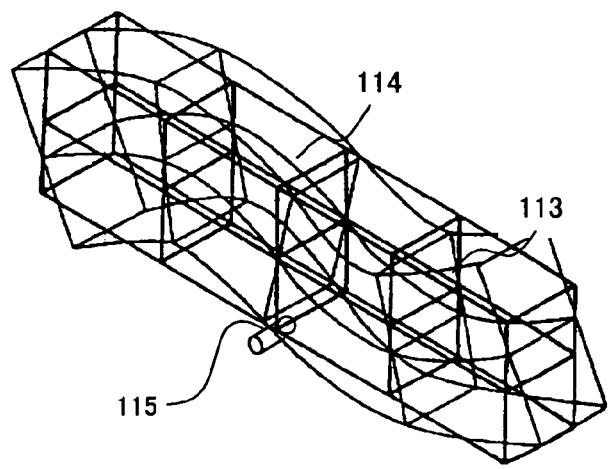
F I G. 7 B
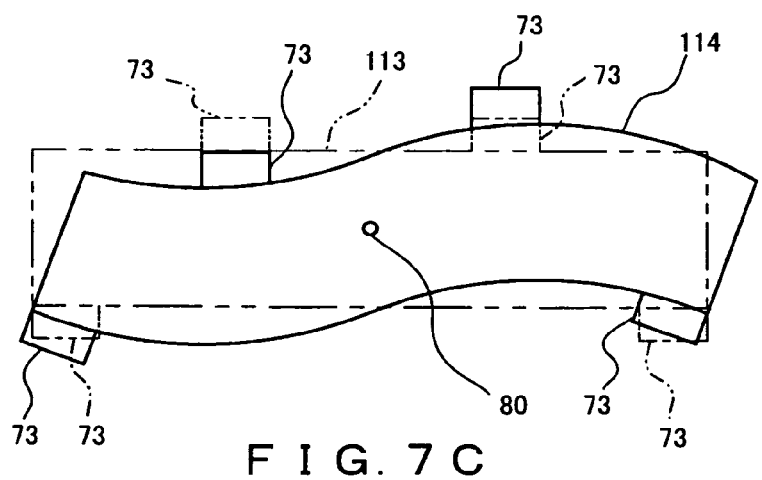
F I G. 7 C

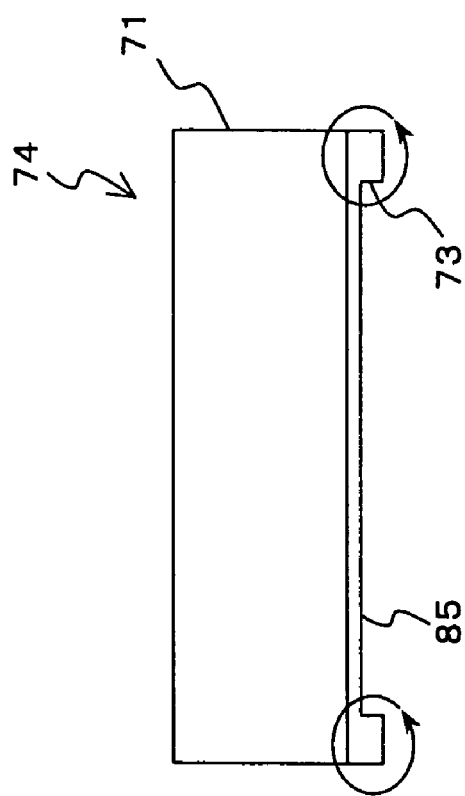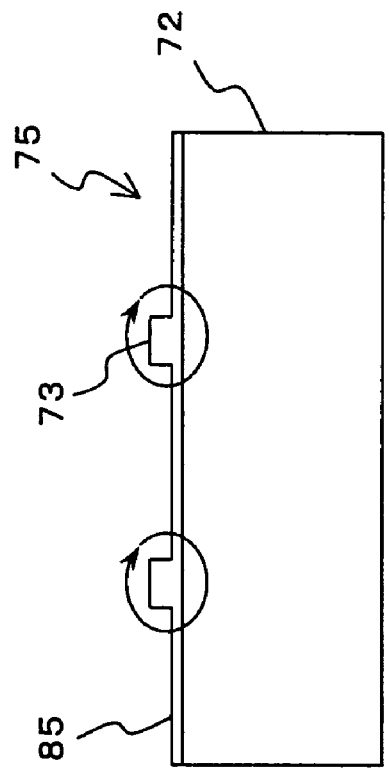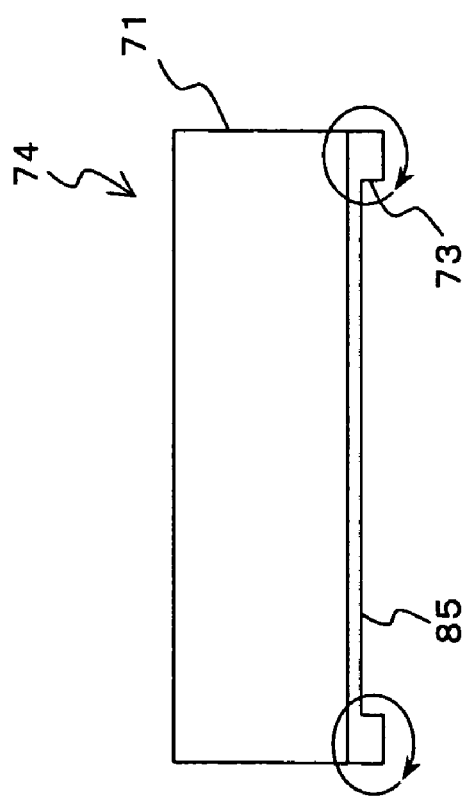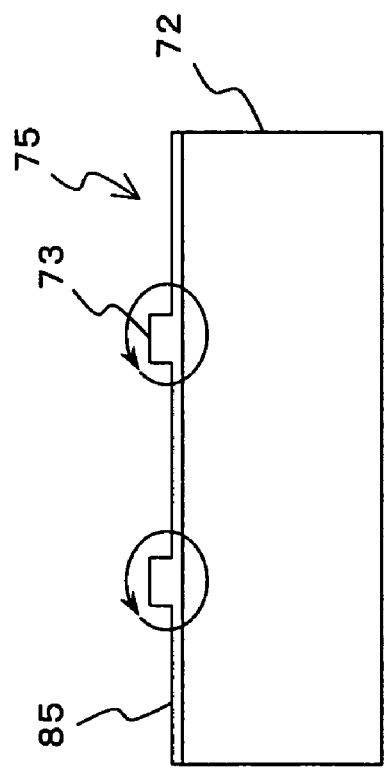
FIG. 8A
FIG. 8B

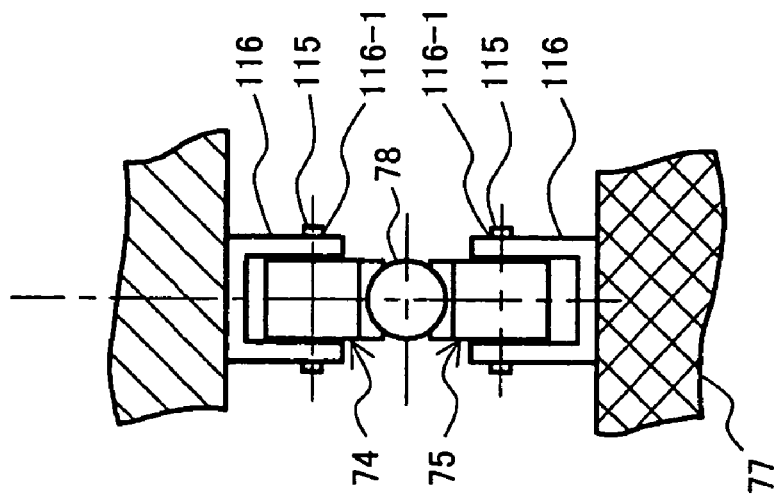
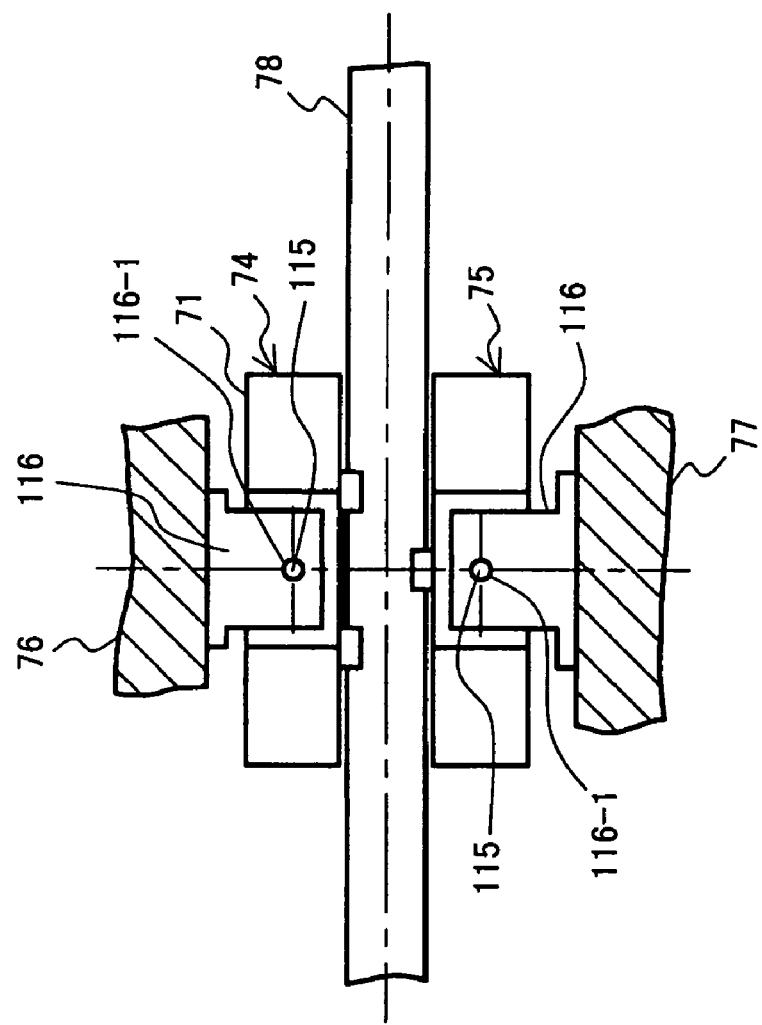
FIG. 9A
FIG. 9B

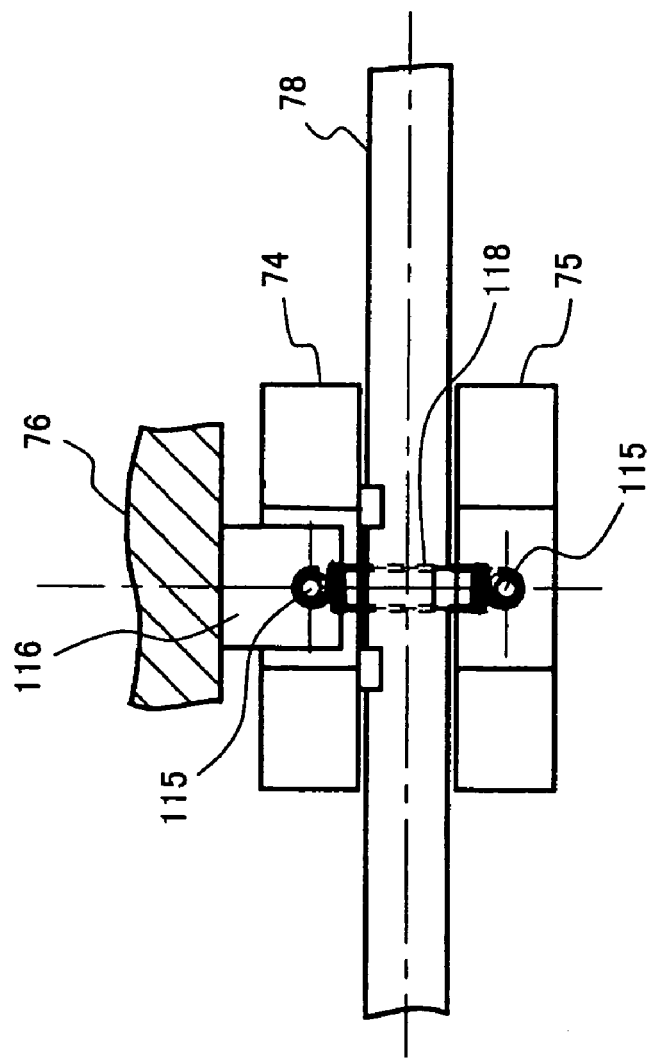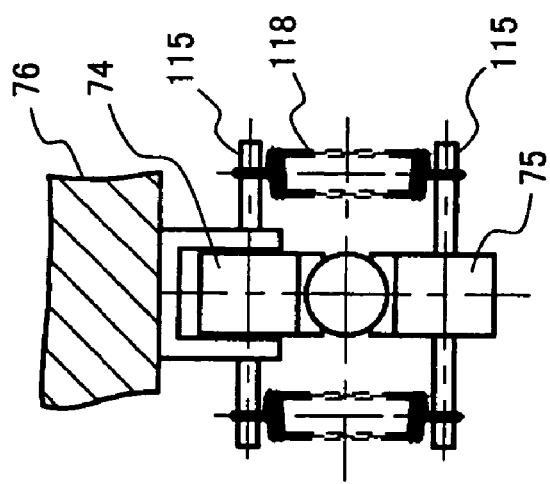

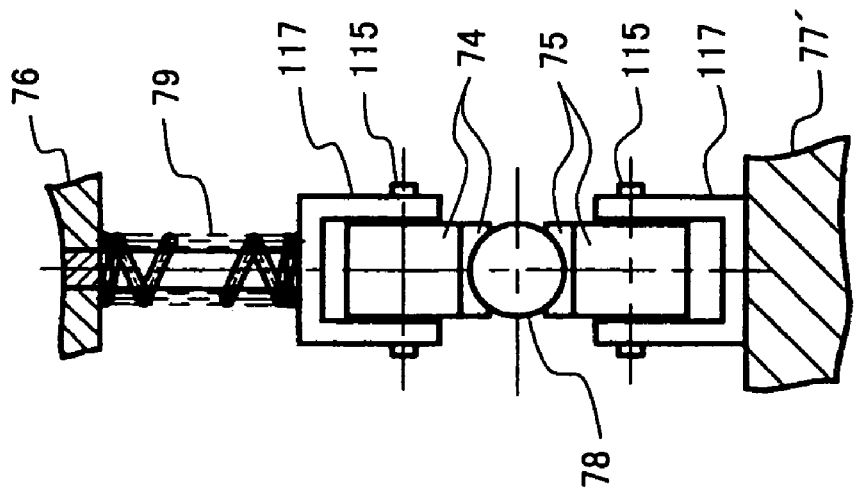
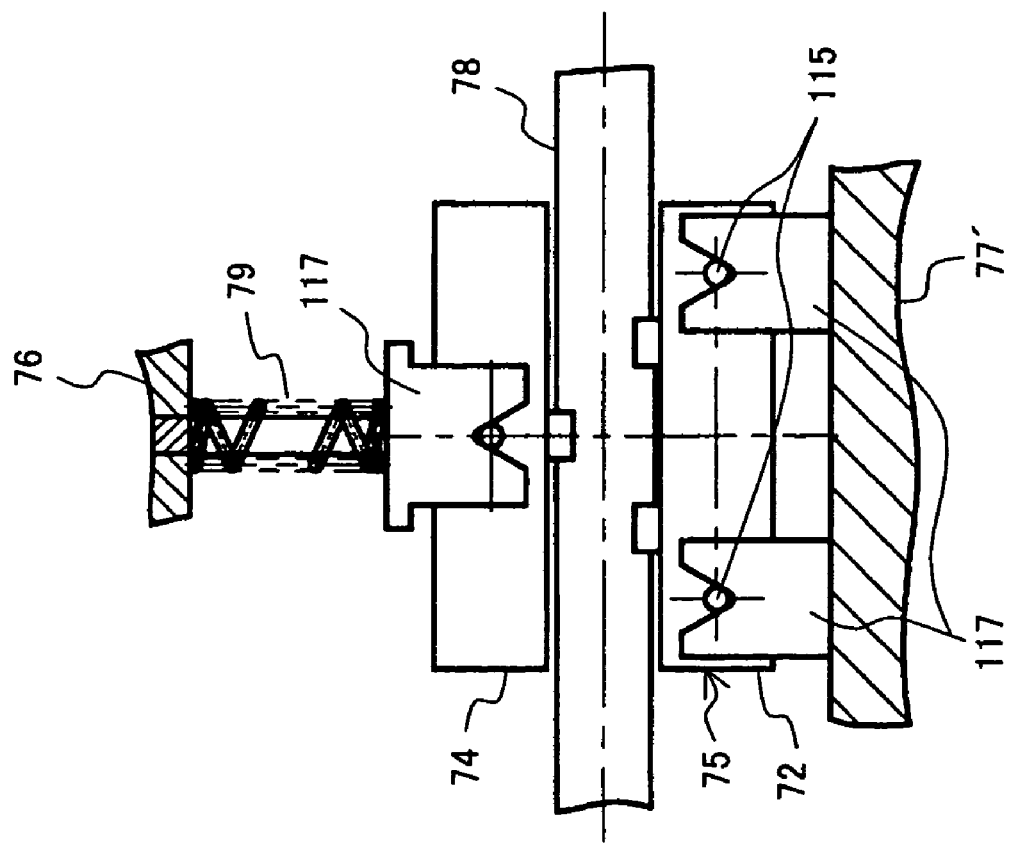
FIG. 12A
FIG. 12B

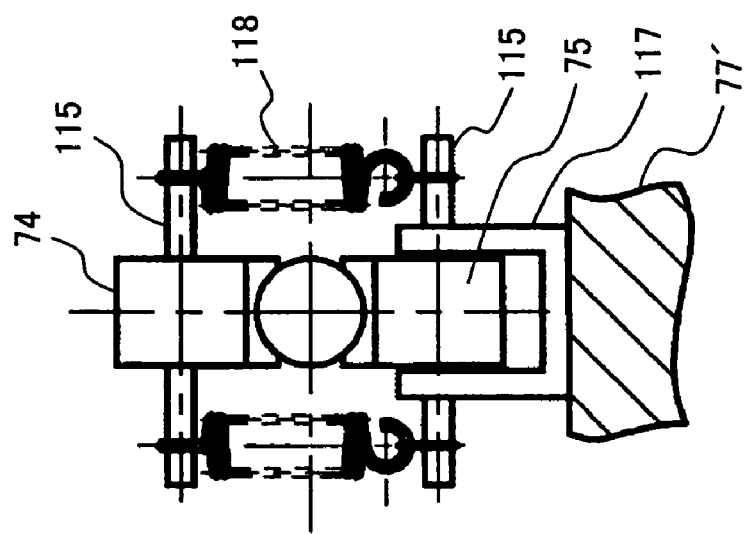
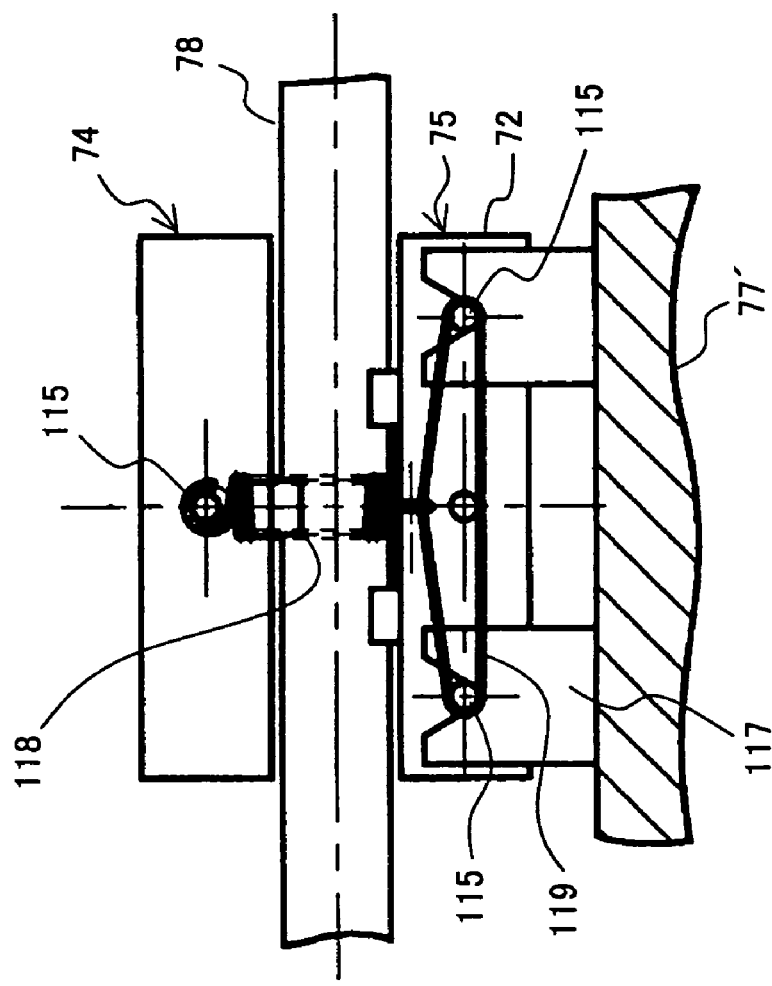
FIG. 13A
FIG. 13B

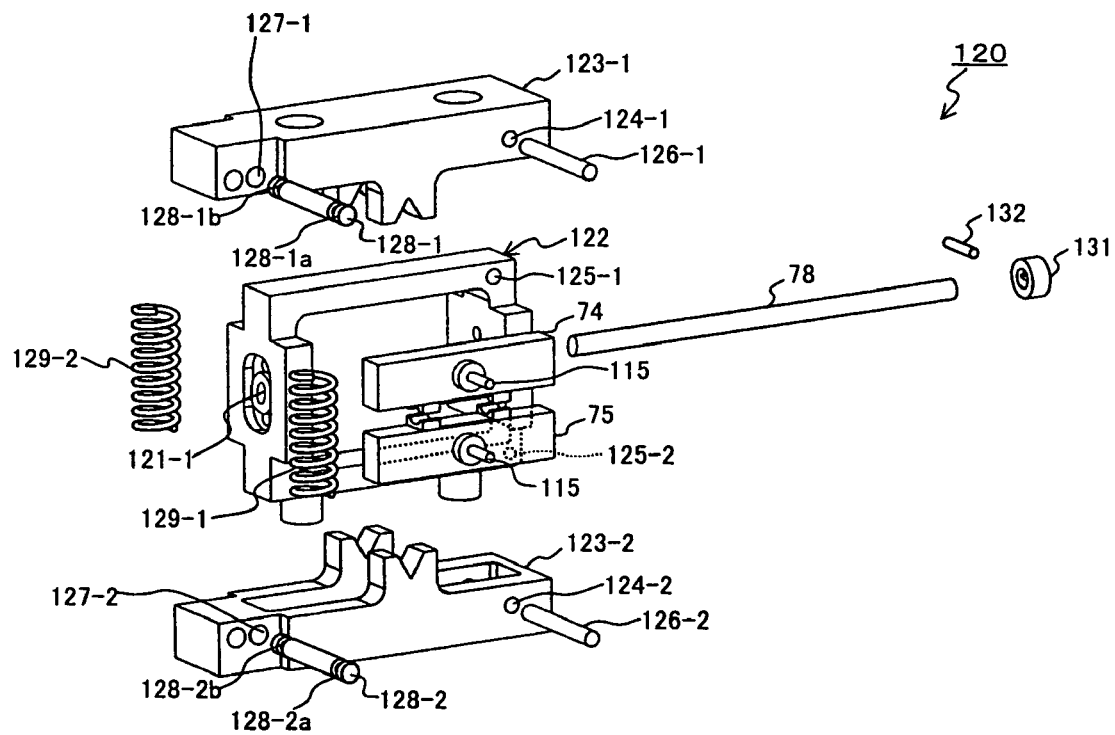
F I G. 1 4 A
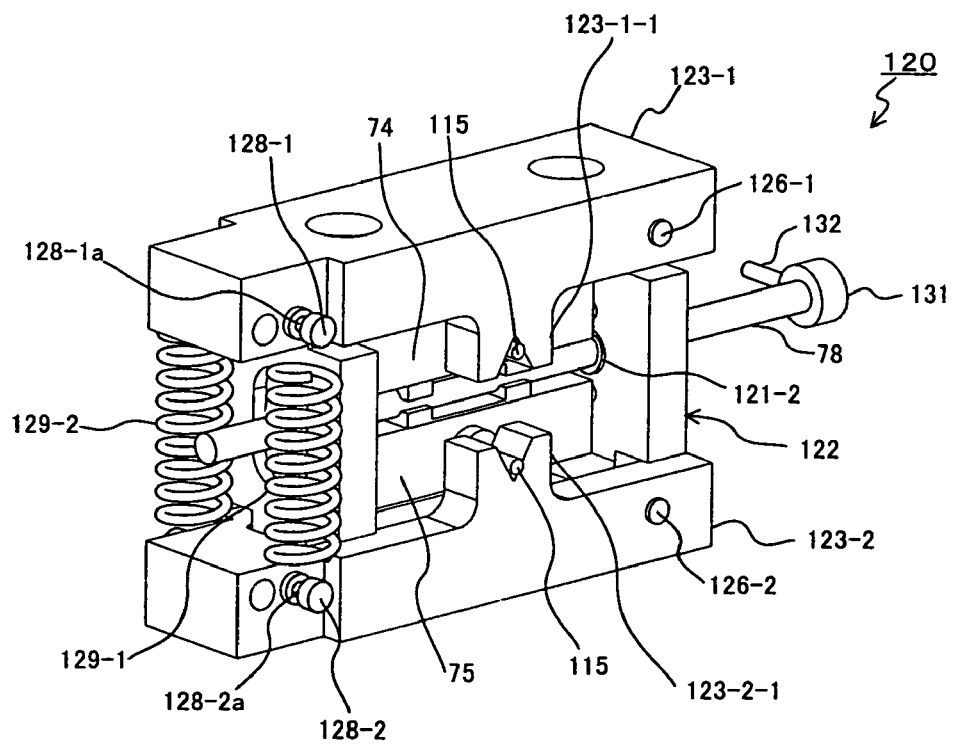
F I G. 1 4 B

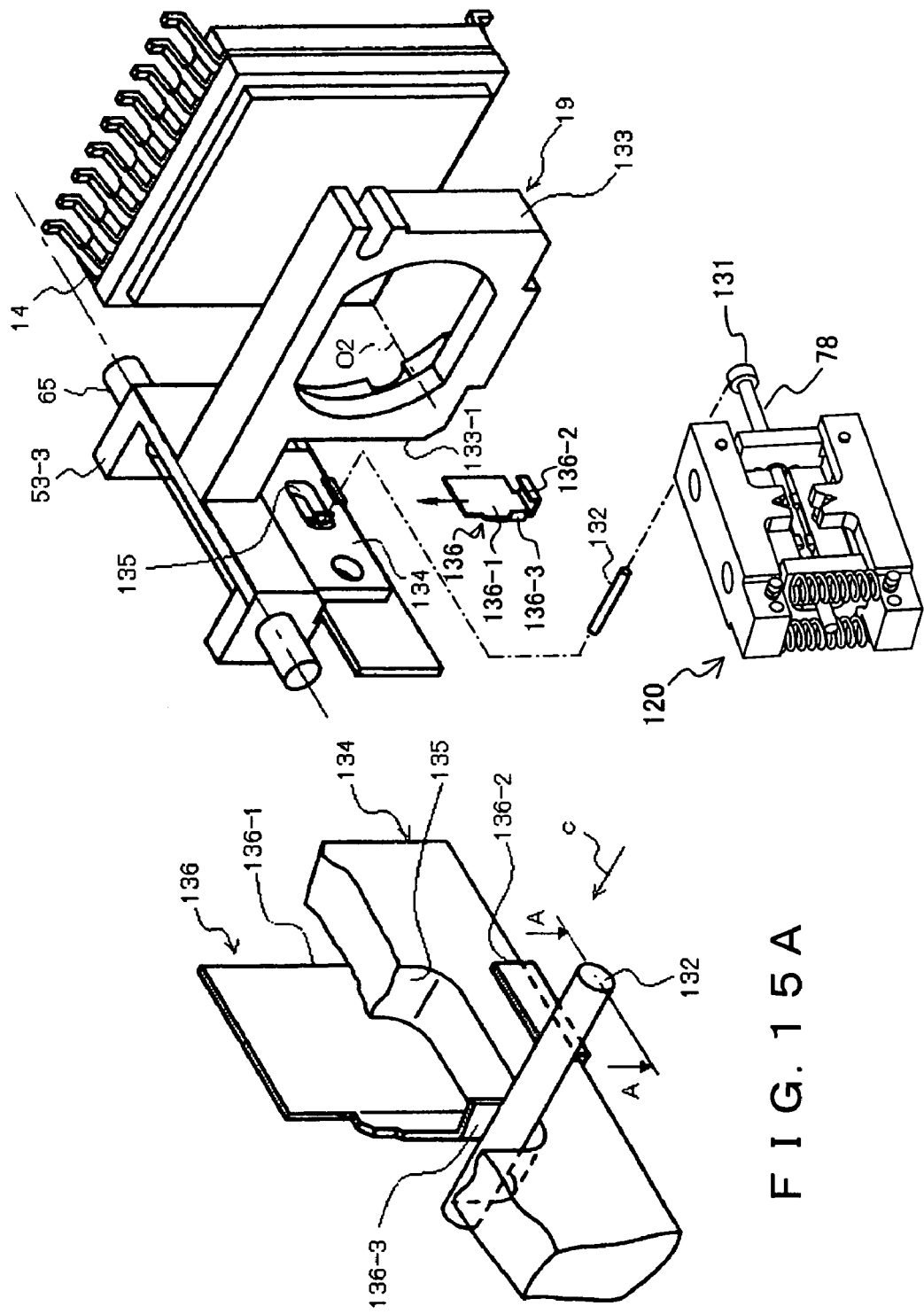

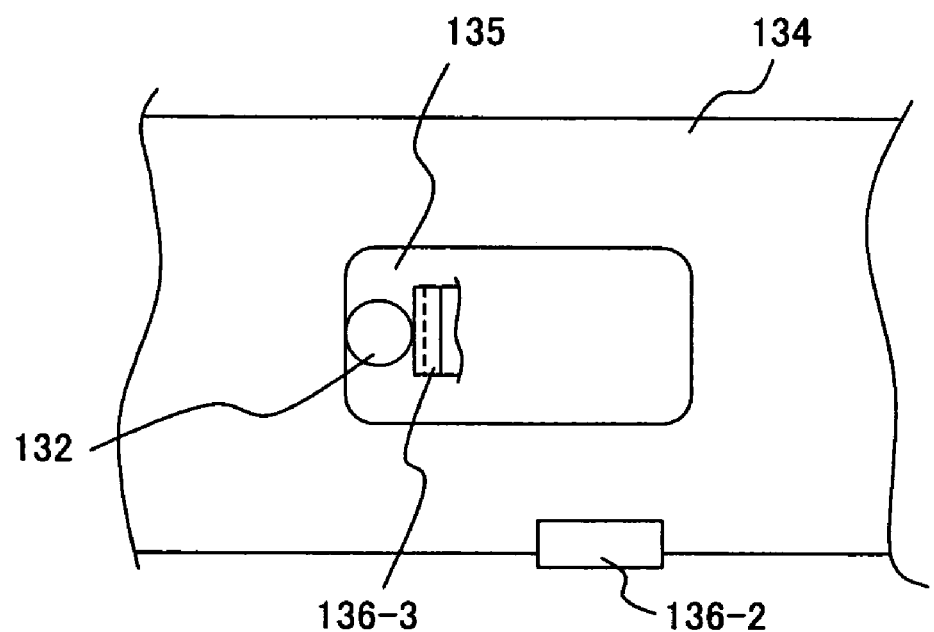
F I G. 1 6 A
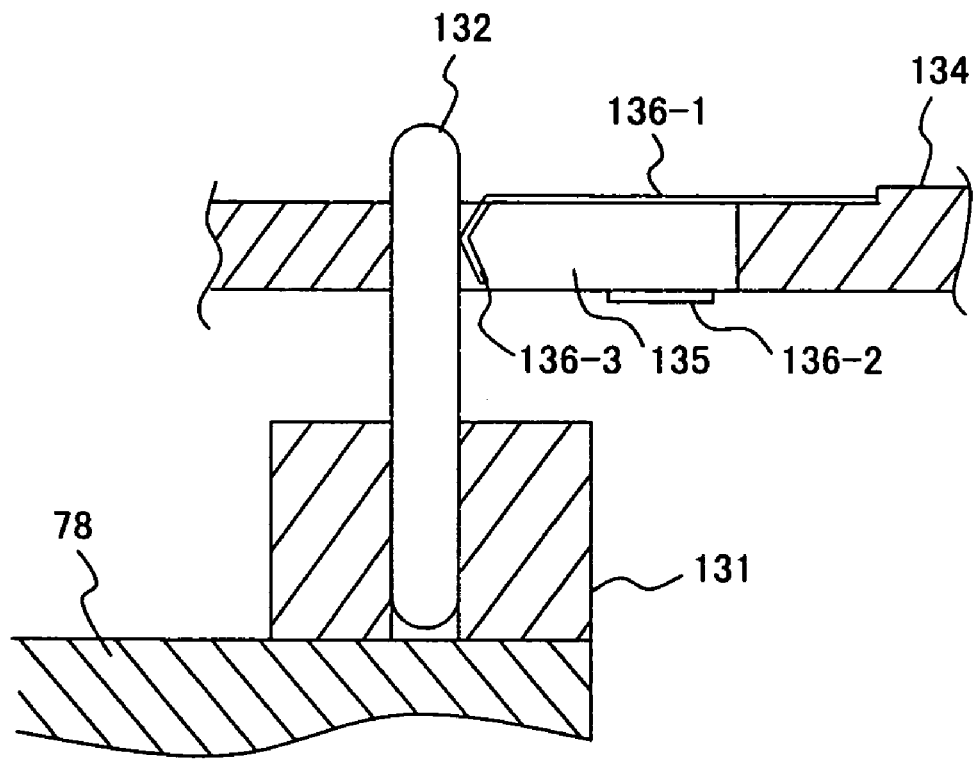
F I G. 1 6 B

VIBRATION WAVE LINEAR MOTOR AND LENS IMPLEMENT USING VIBRATION WAVE LINEAR MOTOR

CROSS REFERENCE TO RELATED APPLICATION

This application is based upon and claims the benefit of priority from the prior Japanese Application No. 2004-247962, filed Aug. 27, 2004, the entire contents of which are incorporated herein by reference.

BACKGROUND OF THE INVENTION

1. Field of the Invention

The present invention relates to a vibration wave linear motor which implements an ultrasonic vibrator, and in particular, a vibration wave linear motor and lens implement thereof with a simple configuration that can be miniaturized.

2. Description of the Related Art

In recent years, attention has been focused on an ultrasonic motor (vibration wave motor) as a new motor to replace electromagnetic motor. In comparison to a conventional electromagnetic motor, this ultrasonic motor has advantages such as: (a) obtaining high thrust at a low speed without a gear; (b) high holding force; (c) long strokes and high resolution; (d) low noise; and (e) no generation of magnetic noise and no noise-influence.

As a conventional ultrasonic motor having such advantages, a linear ultrasonic motor is proposed, wherein a movement part comprises two vibration boards, one guide shaft is held between the opposing parts of protruding parts which are formed with each on the opposing surfaces of these vibration boards, and the movement part moves along the guide shaft by the vibration of the two vibration boards. (For example, refer to paragraphs [0011] to [0012] and FIG. 1 of Japanese Patent Laid-Open Publication No. 09-051687.)

SUMMARY OF THE INVENTION

The vibration wave linear motor of the present invention comprises: a driven component; a first vibrator comprising two or more driving contacting parts for driving the driven component in one predetermined direction; a second vibrator comprising one or more driving contacting parts for driving the driven component in the same direction as the drive from the first vibrator; a first support part for fixing and holding either one of the first vibrator or the second vibrator; a second support part for holding the other of either one of the first vibrator or the second vibrator to enable swinging; and a pressing component for pressing the first or second vibrator, which is held by the second support part to enable swinging, to the driven component.

BRIEF DESCRIPTION OF THE DRAWINGS

FIG. 1A is a perspective view showing the outer appearance of a lens implement comprising a vibration wave linear motor according to the present invention;

FIG. 1B is a diagram showing a simplified structure of respective lens unit parts when a cross section, taken along arrow line A–A', of the lens implement shown in FIG. 1A, is viewed in the direction of arrow a in FIG. 1A;

FIG. 4A is a side view showing a basic structure of a vibration wave linear motor implemented in the present example;

FIG. 4B is a front view of the basic structure of the vibration wave linear motor;

FIG. 4C is a side view showing another example of a basic structure of the vibration wave linear motor;

FIG. 4D is a front view of another example of a basic structure of the vibration wave linear motor;

FIG. 5A and FIG. 5B are diagrams showing examples of the shape of the cross-section of the contacting surface of a driving contacting part to a shaft;

FIG. 5C to FIG. 5E are diagrams showing examples of the position of the driving contacting part to the vibrator unit;

FIG. 6A is a front view of the vibrator unit in the vibration wave linear motor;

FIG. 6B is a side view of the vibrator unit in the vibration wave linear motor;

FIG. 6C is a diagram showing the positioning of piezoelectric sheets and electrodes of the vibrator unit shown in FIG. 6A and FIG. 6B;

FIG. 6D and FIG. 6E are diagrams showing two examples of other structures of the vibrator unit;

FIG. 7A and FIG. 7B are perspective views schematically explaining ultrasonic elliptical vibrations of the vibrator unit of the vibration wave linear motor which is vibration-driven by voltage application to electrodes;

FIG. 7C is a diagram showing a secondary flexural vibration in a simplified manner through only the contour of the vibrator unit;

FIG. 8A and FIG. 8B are diagrams schematically showing the elliptical vibration of the driving contacting parts of the vibrator unit when an alternating current voltage having a phase that differs by $\pi/2$ in the neighborhood of the resonance frequency is applied;

FIG. 9A and FIG. 9B are diagrams showing the structure of the vibration wave linear motor in a first embodiment;

FIG. 11A and FIG. 11B are diagrams showing the structure of the vibration wave linear motor in a third embodiment;

FIG. 12A and FIG. 12B are diagrams showing the structure of the vibration wave linear motor in a fourth embodiment;

FIG. 13A and FIG. 13B are diagrams showing the structure of the vibration wave linear motor in a fifth embodiment;

FIG. 14A is an exploded perspective of the vibration wave linear motor implemented in a sixth embodiment;

FIG. 14B is a perspective view showing the vibration wave linear motor in the sixth embodiment in an assembled state;

FIG. 15A is a perspective view explaining a method for joining the vibration wave linear motor and a third mobile lens frame;

FIG. 15B is an enlarged perspective view showing only the joining section of the vibration wave linear motor and the third mobile lens frame;

FIG. 16A is a diagram showing FIG. 15B when viewed in the direction of arrow c; and FIG. 16B is a cross-sectional view of FIG. 15B when taken along arrow line A–A'.

DESCRIPTION OF THE PREFERRED EMBODIMENTS

Figure 2:
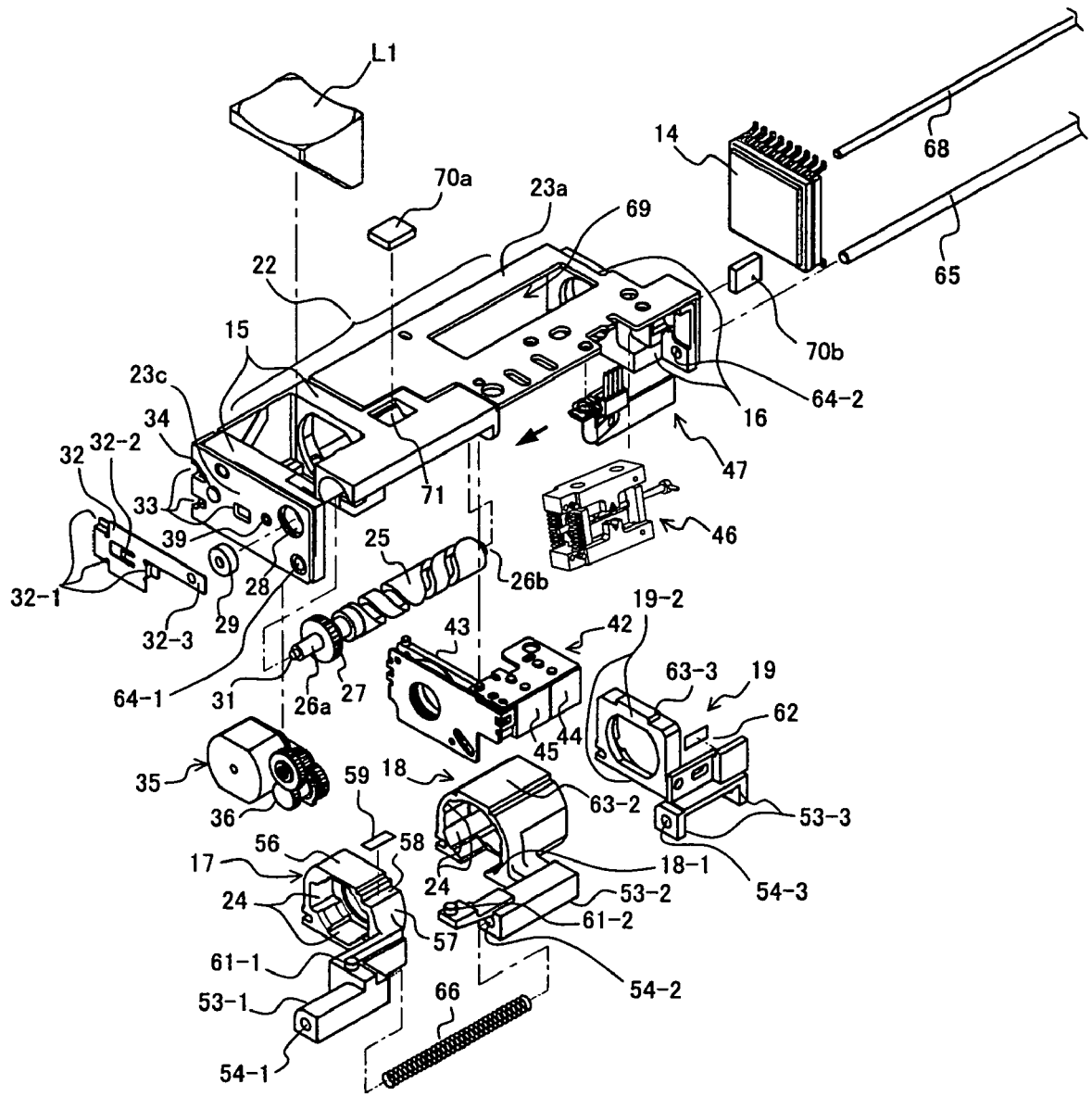
FIG. 2 is an exploded perspective view of the lens implement when viewed from above.

Preferred embodiments of the present invention are explained below in reference to the diagrams.

[Basic Structure of the Embodiments]

FIG. 1A is a perspective view showing the outer appearance of a lens implement comprising a vibration wave linear motor according to the present invention. FIG. 1B is a diagram showing the lens implement shown in FIG. 1A when a cross section taken along arrow line A–A' is viewed in the direction of arrow a in FIG. 1A and shows a simplified structure of respective lens unit parts.

In FIG. 1A, a portion of circuit board 2 comprising a control circuit for controlling the driving of each part in lens implement 1 assembled within the housing of a main body apparatus, for example, such as a camera, along with lens implement 1.

Lens implement 1 shown in FIG. 1A reflects a beam of light from a subject which is incident from an un-illustrated shooting lens window of the housing of a main body apparatus to a lens L1 along a shooting optical axis O1 (indicated by the vertical direction in FIG. 1A), such that it is bent almost at a right angle in the horizontal direction (an obliquely upper right direction in FIG. 1A) by using a prism formed integrally with lens L1. This lens implement 1 generates a captured image by guiding the incident light beam to an image capturing element 14 provided at the end of lens implement 1 (the end in the obliquely upper right direction in FIG. 1A) and configured, for example, by a CCD (charge coupled device) and the like, along the bent second optical axis O2 shown in FIG. 1B. In FIG. 1A, the lens L1 is arranged upward and the image capturing element 14 is arranged downward within the housing of the main body apparatus.

As shown in FIG. 1B, lens implement 1 comprises a plurality of lenses within, configured by a first fixed lens unit 8 composed of lens L1 and lens L2, a first movable lens unit 9 composed of lens L3 and lens L4, a second movable lens unit 11 composed of lens L5, lens L6, and lens L7, a third movable lens unit 12 composed of lens L8, and a second fixed lens unit 13 composed of lens L9, along the second optical axis O2 which is bent in the horizontal direction. In addition, image capturing element 14 is placed at the end of these lens groups.

Lens L1 of the first fixed lens unit 8 is formed integrally with a prism that changes the course of the light beam along the second optical axis O2 by reflecting and bending the light beam from the subject which is incident from the fore-going shooting lens window, along the shooting optical axis O1, by almost 90° in the horizontal direction, held by a first fixed lens frame unit 15 along with lens L2, and fixed within lens implement 1.

In addition, the second fixed lens unit 13, described above, is held by a second fixed lens frame unit 16 and fixed within lens implement 1.

The fore-going first fixed lens frame unit 15 and second fixed lens frame unit 16 are integrally formed by molding with resin at the end of a metal frame, hereafter described, which has an almost L-shaped cross-section cut perpendicular to the second optical axis O2, in a long-side direction.

A first movable lens frame 17 holding the first movable lens unit 9, a second movable lens frame 18 holding the second movable lens unit 11, and a third movable lens frame 19 holding the third movable lens unit 12 are placed between the first fixed lens frame unit 15 and the second fixed lens frame unit 16.

The first movable lens frame 17, the second movable lens frame 18, and the third movable lens frame 19 respectively hold the first movable lens unit 9, the second movable lens unit 11, and the third movable lens unit 12 to enable independent movement along the second optical axis O2 that is bent almost at a right angle by lens L1 (also referred to as prism L1, hereinafter)

The first movable lens unit 9 and the second movable lens unit 11 are provided to change the focal distance of the light beam of the subject which is incident along the second optical axis O2 of the optical system of this lens implement 1.

In other words, the first movable lens frame 17 and the second movable lens frame 18, which respectively hold the first movable lens unit 9 and the second movable lens unit 11, are provided to adjust the zoom ratio of the lens system.

In addition, the third movable lens unit 12 is provided to adjust the focal point at which the light beam forms an image on the image capturing element 14. In other words, the third movable lens frame 19 holding the third movable lens unit 12 is provided as a lens frame for focusing which can move freely in the direction of the second optical axis O2.

Furthermore, 21, between the first movable lens unit 9 and the second movable lens unit 11, indicates a position of an aperture.

Still further, in this lens unit, frame cut parts 15-1, 18-1, and 19-1 are formed by cutting at a part or the whole of frame walls in either of the upper and lower direction to the second optical axis O2 (portions corresponding to the bottom part of the lens in the lower portion in the example shown in FIG. 1B), of the first fixed lens frame unit 15, the second movable lens frame 18, and the third movable lens frame 19 respectively holding the first fixed lens unit 8, the second movable lens unit 11, and the third movable lens unit 12 respectively comprising lenses L2, L5, and L8 of relatively large diameters, such that the upper and lower thickness (actually thickness in the direction of depth as lens unit for shooting) is as thin as possible.

In regards to the second and the third movable lens frames 18 and 19, the strengths of which become weak by the amount deficient from the cut frame walls, and which do not particularly have other reinforced portions unlike the first fixed lens frame 15, a convex part, hereafter described, which protrudes externally is provided on a side opposite to the cut part, across the second optical axis O2, namely, on the upper frame wall.

In FIG. 1B, the upper frame walls of the second and the third movable lens frames 18 and 19 look slightly thick because a cross-section of the convex part is depicted.

In addition, with regards to the third movable lens frame 19, a protruding part 19-2 is provided to wrap around from a lens barrel part formed on a side opposite to cut part 19-1 formed at the lower side of the lens L8 towards the left hand side which is out of range of the effective light beam of the lens L8 because it is, as a whole, thin and weak in the direction of width and reinforcement by the fore-going convex part, alone, may be insufficient.

FIG. 2 is an exploded perspective view showing the lens implement 1 when viewed from above.

Figure 3:
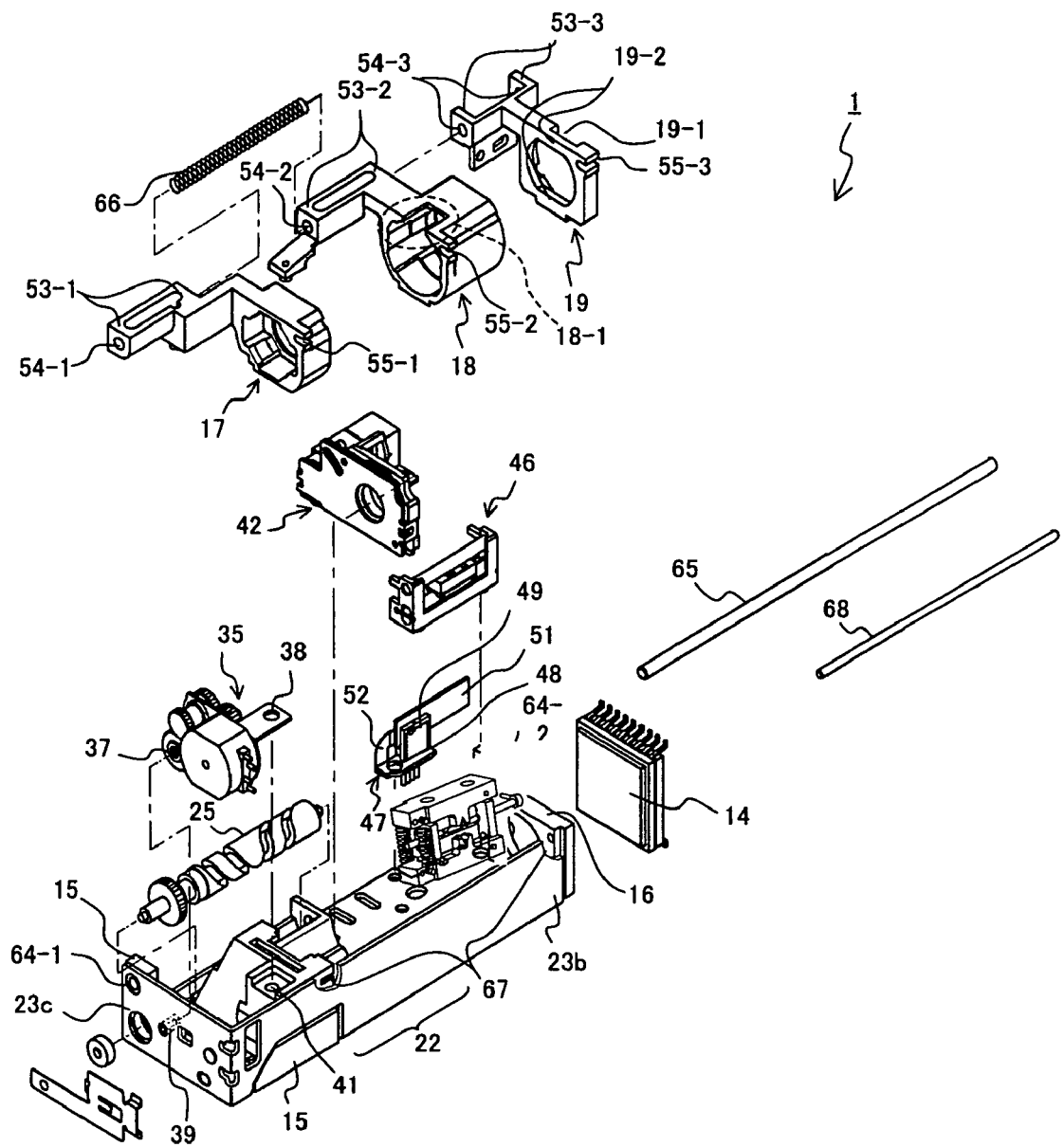
FIG. 3 is an exploded perspective view of the lens implement when held upside down and viewed from below.

FIG. 3 is an exploded perspective view showing the lens implement 1 when held upside down and viewed from above. In FIG. 2 and FIG. 3, constituent parts which are the same as those shown in FIG. 1A and FIG. 1B are denoted with the same reference numerals.

As shown in FIG. 2 and FIG. 3, above, the lens implement 1 comprises a main fixed lens frame 22. When all of the constituent elements shown in FIG. 2 or FIG. 3 are assembled and accommodated inside and outside the main fixed lens frame 22, the whole of the lens implement 1 has an outer shape, shown in FIG. 1A, of the main body of the apparatus wherein the constituent elements are comprised on two main surfaces of opposing rectangles and in a flat space between the two main surfaces.

The above-described main fixed lens frame 22 comprises a metal frame 23a which forms at least one of the above-described two main surfaces. In this structure of lens implement 1, the other main surface is open.

Also, one side in the long-side direction of the flat space between one main surface which is formed by the metal frame 23a and the other open main surface is configured by a metal frame 23b connected almost at a right angle from the metal frame 23a on one of the main surfaces.

Additionally, one side surface in the short-side direction (the side in the obliquely lower-left short-side direction in FIG. 2 and FIG. 3) is configured by a metal frame 23c connected, respectively, almost at a right angle to the metal frame 23a on the main surface and the metal frame 23b of the side surface in the long-side direction, as well.

In this way, the metal frame 23 (23a and 23b) configures an L-shaped metal frame, wherein the cross-section perpendicular to the long-side direction (also the direction of the above-described bent second optical axis O2) comprises one main surface and one side surface in the long-side direction, and has an ideal structure implementing high rigidity with a small amount of a material.

A fixed molded part formed integrally with the metal frame 23 by using outsert molding is formed, respectively, at both ends of the metal frame 23 in the long-side direction.

These two fixed molded parts are the first fixed lens frame unit 15 and the second fixed lens frame unit 16 which are also shown in FIG. 1B.

Furthermore, in the first fixed lens frame unit 15, prism L1 also shown in FIG. 1B and lens L2 omitted in FIG. 2 and FIG. 3 are held and fixed.

Still further, in the second fixed lens frame unit 16, lens L9 which is shown in FIG. 1B but omitted in FIG. 2 and FIG. 3 is held and fixed.

Three movable lens frames (a first movable lens frame 17, a second movable lens frame 18, and a third movable lens frame 19), which are also shown in FIG. 1B, are arranged between the first fixed lens frame unit 15 and the second fixed lens frame unit 16.

An adhesive deposit part 24 (refer to FIG. 2) which prevents adhesive for holding and fixing respective lenses from overflowing is formed in the three movable lens frames and the two fixed lens frames.

This adhesive deposit part 24 is a tiny space formed between the surface of the perimeter of the fixed lens and the lens frame.

Adhesive deposit parts of the third movable lens frame 19 and the second fixed lens frame unit 16 are not shown in FIG. 2 and FIG. 3 because they are hidden. In addition, adhesive deposit part of the first fixed lens frame unit 15 is provided in the portion corresponding to the side-surface of the prism formed integrally with lens L1, although this cannot be clearly seen.

Before the fore-going three movable lens frames are assembled, a zooming shaft cam 25 is placed in proximity to the side-surface of the main fixed lens frame 22 on the open side in the long-side direction and to the side-surface of the first fixed lens frame unit 15.

The zooming shaft cam 25 comprises a large diameter part forming a circular surface on which cam grooves of a cam unit are provided and a small diameter part 26 (26a and 26b) which protrudes concentrically from both of the ends of the large diameter part. A gear 27 is fixed to the small diameter part 26a that protrudes from the end on the side opposite to the image capturing element 14.

After the small diameter part 26a of the zooming shaft cam 25 is inserted into a shaft bearing insertion hole 28 formed in a part bonded integrally with the metal frame 23c of the first fixed lens frame unit 15, the other small diameter part 26b is inserted into a shaft bearing hole which is formed in the first fixed lens frame unit 15 and is hidden and cannot be seen in FIG. 2, while pulling the zooming shaft cam 25 in the obliquely right direction in this diagram such that the small diameter part 26a is engaged with a shaft bearing 29 in the shaft bearing insertion hole 28. As a result, the zooming shaft cam 25 is held to enable rotation to the first fixed lens frame unit 15.

A convex part 31 which has a smaller diameter is formed at the tip of the small diameter part 26a of the zooming shaft cam 25. This convex part 31 protrudes externally and upward from the shaft bearing 29 when the small diameter part 26a engages with the shaft bearing 29. This convex part 31 is pressed by a pressing board spring 32, whereby the zooming shaft cam 25 is positioned by the upper and the lower shaft bearings and stably supported.

The pressing board spring 32 comprises three bent leg parts 32-1 which are formed by separating each part partially from an almost square main body with a notch, bending downward, and bending the tip to be horizontal, a stop segment 32-2 which is formed by cutting the center of the main body, and a pressing spring part 32-3 which extends integrally from the main body.

On the other hand, on the side of the metal frame 23c, three notches 33 are formed in positions corresponding to the three bent leg parts 32-1 of the pressing board spring 32 and a convex part 34 which corresponds to the stop segment 32-2 of the pressing board spring 32 is formed almost at the center surrounded by the three notches 33.

When the main body of the pressing board spring 32 is pushed into the side of the metal frame 23c while engaging the three bent leg parts 32-1 of the pressing board spring 32 with the three notches 33 of the metal frame 23c, the tip of the stop segment 32-2 engages with the circular surface of the convex part 34.

As a result, the pressing board spring 32 is fixed on the outer surface of the metal frame 23c, the convex part 31 of the zooming shaft cam 25 is pressed by the tip of the pressing spring part 32-3, and the zooming shaft cam 25 is positioned.

As a result, the zooming shaft cam 25 is placed in proximity to prism L1 which is held by the first fixed lens frame unit 15, the central shaft of which is in the long-side direction of the main fixed lens frame 22, namely, in parallel with the second optical axis O2, and placed so that at least a portion in the axial direction is adjacent to the side-surface of prism L1.

Then, a zooming motor unit 35 is placed in a space (refer to FIG. 3) shaped almost like a triangular pole, which is formed by a slope of the first fixed lens frame unit 15, which holds the back-side of the reflection plane of lens (prism) L1, and the metal frame 23c. Speed-reduction gear train 36 engages with gear 27 of the zooming shaft cam 25. This zooming motor unit 35 is fixed to the first fixed lens frame unit 15 by securing with screws two securing parts (refer to FIG. 3) of a gear shaft fixing part 37 and a securing board fixing part 38 to a positioning hole 39 formed on the first fixed lens frame unit 15 and to a securing hole 41.

Then, an aperture/shutter unit 42 is assembled to the main fixed lens frame 22. The aperture/shutter unit 42 (hereafter, refer to FIG. 2) comprises an aperture/shutter part 43 having an aperture which controls the amount of passing light from the reflection light forming the second optical axis O2 and a shutter, and rotary solenoids 44 and 45 which mechanically drive the aperture and the shutter of the aperture/shutter part 43, respectively.

The aperture/shutter part 43 is arranged in the position 21 of the aperture shown in FIG. 1B, and the two rotary solenoids 44 and 45 are arranged below the zooming shaft cam 25.

Furthermore, a vibration wave linear motor 46 for moving and driving the third movable lens frame 19 and a magnetic sensor unit 47 are aligned, overlapping, in the short-side direction of the main fixed lens frame 22 below the aperture/shutter unit 42.

As a result, the vibration wave linear motor 46 is placed in a position in the extending direction of the shaft of the zooming shaft cam 25 and on the side of the image capturing surface.

The magnetic sensor unit 47 (refer to FIG. 3) comprises a magnetic sensor holder 48, a magnetic sensor 49, a magnetic scale 51, and a pressing spring 52.

The above-described vibration wave linear motor 46 and magnetic sensor unit 47 will be described in detail hereafter.

After each of the above-described components are arranged in this way, the first movable lens frame 17, the second movable lens frame 18, and the third movable lens frame 19, to which the movable lens parts 9, 11, and 12 shown in FIG. 1B (illustration omitted in FIG. 2 and FIG. 3) are respectively fixed with an adhesive, are assembled.

Although this is not clearly shown in FIG. 1B because it is a cross-sectional side view, the top and bottom (the top and bottom in FIG. 1B, as well) of each of the lenses L3 to L8 of the movable lens part 9, 11, and 12, which are respectively held by the first movable lens frame 17, the second movable lens frame 18, and the third movable lens frame 19 and shown in FIG. 1B, are cut for the lens implement 1 shown in FIG. 1A, the top and the bottom surfaces form flat surfaces, and the lenses are shaped like an oval when viewed from the front.

In addition, the top and the bottom surfaces (the top and bottom of lens implement 1 shown in FIG. 1A, and the top and bottom of the lens unit shown in FIG. 1B) along the second optical axis O2 are formed to be flat in correspondence to the fact that the circumferences of the lens holding units of the first, second, and third movable lens frames 17, 18, and 19 hold the oval-shaped lens stated above. This enables a reduction in the thickness of the movable lens frames embedded in lens implement 1.

For a further reduction in the thicknesses of the second and the third movable lens frames 18 and 19, frame walls, which correspond to the flat surfaces of the bottoms of the lenses, of the bottoms (the lower portions in FIG. 2, and the upper portions in FIG. 3) of the lens frames holding the lenses are cut to form cut parts 18-1 and 19-1, shown in FIG. 1B, and the flat parts of the bottom of the lenses are exposed.

The fore-going cut part of the second movable lens frame 18 is shown in FIG. 2 and FIG. 3. However, the cut part of the third movable lens frame 19 cannot be seen clearly because it is hidden by the remaining peripheral portion of the lens frame.

The first movable lens frame 17, the second movable lens frame 18, and the third movable lens frame 19 (refer to FIG. 2) respectively comprise shaft bearing parts 53 (53-1, 53-2, and 53-3), in which guide holes 54 (54-1, 54-2, and 54-3) are provided respectively.

In addition, the first movable lens frame 17, the second movable lens frame 18, and the third movable lens frame 19 respectively comprise U-shaped cut parts 55 (55-1, 55-2, and 55-3) at the ends opposite of the shaft bearing parts 53 (refer to FIG. 3).

Furthermore, a light reflecting component 59 is attached to and placed on an uneven part 58 formed on the boundary between a front outer surface 56 (see FIG. 2), which opposes a back portion having the above-described shaft bearing parts 53-1 and the U-shaped cut part 55-1 of the first movable lens frame 17, and a side surface 57 wherein the shaft bearing part 53-1 is arranged.

Still further, cam followers 61 (61-1, 61-2) are respectively formed on a portion which protrudes in the horizontal direction integrally with the shaft bearing part 53-1 of the first movable lens frame 17 and a portion which extends upward integrally with the shaft bearing part 53-2 of the second movable lens frame 18.

Still further, a light reflecting component 62 is attached to a side surface that is erected in the horizontal direction integrally with the shaft bearing part 53-3 of the third movable lens frame 19.

Still further, in the second movable lens frame 18 and the third movable lens frame 19, convex parts 63 (63-2 and 63-3) for reinforcement, explained with reference to FIG. 1B, are formed on the front outer surface opposite of the back portion having the shaft bearing parts 53 (53-2 and 53-3) and the U-shaped cut parts 55 (55-2 and 55-3).

These convex parts 63 are provided to reinforce the strength of the lens frame which is insufficient due to the frame wall cut corresponding to the back flat portion of the oval lens, in order to reduce the thickness of the entire apparatus.

In addition, a first guide shaft 65, both ends of which are supported by guide shaft supporting holes 64 (64-1 and 64-2) formed at corners closest to the open side surface and the open main surface of the first fixed lens frame unit 15 and the second fixed lens frame unit 16, respectively, is inserted into guide holes 54 of the three movable lens frames.

As a result, the first, second, and third movable lens frames 17, 18, and 19 (namely, the three movable lens parts 9, 11, and 12) are supported to enable movement in the direction of optical axis O2, shown in FIG. 1B.

Furthermore, the guide shaft supporting holes 64 (64-1, 64-2) which support the first guide shaft 65 are formed at the corners closest to the open side surface and the open main surface. Therefore, the first guide shaft 65 is placed as close as possible to the outermost portion wherein the open side surface and the open main surface join, within the main body of the lens implement 1 formed by the main fixed lens frame 22

The first guide shaft 65, which is placed as close as possible to the outermost portion, supports the shaft bearing parts 53 in this way, and thereby, the three movable lens frames are arranged within the narrow and flat main body of the apparatus without wasting space.

When the first guide shaft 65 is inserted, a compressed spring 66 which has a pressing force is externally attached to the first guide shaft 65 between the shaft bearing part 53-1 of the first movable lens frame 17 and the shaft bearing part 53-2 of the second movable lens frame 18.

In addition, a second guide shaft 68 is placed such that both ends of which is supported by other two guide shaft supporting holes 67 (see FIG. 3) formed in positions closest to the closed side surface and the open main surface, which are configured by the metal frame 23b of the first fixed lens frame unit 15 and the second fixed lens frame unit 16, before the three movable lens frames are assembled.

When assembling the three movable lens frames, the respective movable lens frames are rotated inwardly by using the second guide shaft 68 as a pivot, after the above-described U-shaped cut parts 55 are supported to slide freely by fitting into the second guide shaft 68 horizontally, whereby cam followers 61 placed in the first movable lens frame 17 and the second movable lens frame 18 freely and smoothly penetrate the cam grooves of the zooming shaft cam 25 to engage therewith.

Namely, cams (the cam grooves with which the cam followers 61-1 and 61-2 engage) which correspond to a plurality of lens frames (the first movable lens frame 17 and the second movable lens frame 18 in this example) are respectively formed in the zooming shaft cam 25.

The cam followers 61 penetrate the cam grooves of the zooming shaft cam 25 as described above, whereby the zooming shaft cam 25, the first movable lens frame 17, and the second movable lens frame 18 engage with one another to slide freely.

In addition, at the same time, the front outer surface 56 (see FIG. 2) of the first movable lens frame 17 is arranged in proximity to the back side of the metal frame 23a forming one main surface, and the convex parts 63 for reinforcement which are formed on the front outer surfaces of the second movable lens frame 18 and the third movable lens frame 19 penetrate an opening part 69 which is formed on the metal frame 23a.

This opening part 69 forms an opening which is vertically long in accordance to the movement stroke of a movable lens in order to avoid an interference with the movement of the movable lens (see lenses L5 to L8 shown in FIG. 1B) moving with the movement of the second movable lens frame 18 and the third movable lens frame 19, namely, in order not to interfere with the movement of convex parts 63.

Hereafter, the first guide shaft 65, described above, is inserted into guide hole 54 of the shaft bearing parts 53 of respective movable lens frames and the guide shaft supporting holes 64 at both of the ends. As a result, the two guide shafts (65 and 68) are arranged adjacent to the zooming shaft cam 25 and in parallel with the shaft of the zooming shaft cam 25.

In this way, the shaft-shaped components are arranged mutually adjacent and in parallel, contributing to the miniaturization of the entire device.

The three movable lens frames (17, 18, and 19), supported by these two guide shafts, are controlled to enable sliding in the direction of optical axis O2, prohibited by one of the guide shafts from rotating around the other guide shaft, positioned in a direction perpendicular to the optical axis O2, and arranged within the main fixed lens frame 22.

In addition, compressed spring 66 is externally attached to the first guide shaft 65, between shaft bearing part 53-1 of the first movable lens frame 17 and shaft bearing part 53-2 of the second movable lens frame 18, whereby the first movable lens frame 17 and the second movable lens frame 18 are pressed in mutually reverse directions.

As a result, cam followers 61-1 and 61-2 which respectively engage with the cam grooves of the zooming shaft cam 25 are respectively pressed against the opposite sides of the wall of the cam grooves of the zooming shaft cam 25. Therefore, play generated between the cam grooves and the cam followers when the zooming shaft cam 25 is rotationally driven is eliminated, and position relationship when the lens frames move to the left or to the right is properly controlled.

In the fore-going arrangement, the first guide shaft 65 is placed adjacent and almost parallel to the zooming shaft cam 25.

Hereafter, image capturing element 14 is installed on the bottom surface of the second fixed lens frame unit 16. Additionally, a photo-sensor installment hole 71 is provided in a position which corresponds to the light reflecting component 59 attached to the first movable lens frame 17 on the surface of the first fixed lens frame unit 15 which exists on the same surface of metal frame 23a. A photo-sensor 70a is placed in this photo-sensor installment hole 71.

This photo-sensor 70a detects the absolute position of the first movable lens frame. The movement distance of the first movable lens frame from the detected absolute position is determined by detecting the movement position by counting the number of steps of a zoom motor of a zooming motor unit 35, which is driven in steps, by a control device which is not shown.

In addition, another photo-sensor 73 is arranged in a position which corresponds to the light reflecting component 62 attached to the third movable lens frame 19 on a side facing the open side of the second lens frame unit 16. This photo-sensor 73 detects the absolute position of the third movable lens frame 19 by detecting the light reflected from light reflecting component 62 attached to the third movable lens frame 19.

After these absolute positions are determined, zooming shaft cam 25 rotates in both forward and backward directions within a predetermined angle range by forward and backward rotations of the motor in the zooming motor unit 35.

Cam follower 61-1 of the first movable lens frame 17 and cam follower 61-2 of the second movable lens frame 18 engage respectively with the two cam grooves provided on the outer perimeter of the zooming shaft cam 25. Through this, the first movable lens frame 17 and the second movable lens frame 18 (namely, the first movable lens unit 9 and the second movable lens unit 11) move close to or apart from each other in the direction of the second optical axis O2, and the image of the light beam proceeding in the direction of the optical axis O2 is zoomed in/out.

In addition, the aperture/shutter unit 42, shown in FIG. 1B, wherein the aperture/shutter part 43 is placed in aperture position 21, between the first and the second movable lens implement 9 and 11, opens/closes the course of the light beam proceeding in the direction of the optical axis O2, and an optical filter (ND filter) controls the amount of light on the image capturing surface, as well.

A vibration wave linear motor that drives the movement of the third lens frame holding the third movable lens part 12 for focusing is described next.

FIG. 4A is a side view showing a basic structure of a vibration wave linear motor implemented in the present embodiment, and FIG. 4B is a front view thereof. FIG. 4C is a side view showing another example of a basic structure, and FIG. 4D is a front view thereof.

A first basic structure of the vibration wave linear motor according to the present embodiment, as shown in FIG. 4A and FIG. 4B, first comprises two upper and lower vibrators 74 and 75 comprising two rectangular vibrator units 71 and 72 and at least one (two for the upper vibrator unit 71 and one for the lower vibrator unit 72 in the example in the diagram) driving contacting part 73 (73-1, 73-2, and 73-3) of a protruding shape, which is formed integrally with the vibrator units 71 and 72, respectively, on the opposite surfaces on the top and the bottom of the vibrator units 71 and 72 or affixed separately.

In addition, in this basic structure of the vibration wave linear motor, a first supporting part 76 for fixing and holding the fore-going vibrator 74, as the first vibrator, and a second supporting part 77, composed of elastic members, for holding the fore-going vibrator 75, as the second vibrator, to enable swinging are provided, and due to the elasticity of this second supporting part 77, vibrators 74 and 75 are relatively pressed towards their respective opposing parts.

In addition, one surface of vibrator 74 has driving contacting parts 73 (73=2 and 73-3) as the first vibrator and the opposite surface are fixed to the first supporting part 76.

Furthermore, this basic structure of the vibration wave linear motor comprises a shaft 78 which is in contact with the driving contacting part 73 of the vibrators 74 and 75 which are pressed relatively towards their respective opposing parts, held between the two vibrators 74 and 75, and, at the same time, is supported to enable movement in a long-side direction (horizontal direction in FIG. 4A and depth direction in FIG. 4B) perpendicular to the direction relative to the opposing part of each vibrator.

Additionally, in another basic structure of the vibration wave linear motor of the present embodiment, shown in FIG. 4C and FIG. 4D, a compressed spring 79 having a pressing force is attached between a supporting part 77' having the same rigidity as the first supporting part 76 and the lower surface of vibrator 75, in place of the elasticity of the second support part 77, and the supporting part 77' and compressed spring 79 comprise a second supporting part.

The first basic structure shown in FIG. 4A and FIG. 4B and the other basic structure shown in FIG. 4C and FIG. 4D only differ with regards to the construction of the second supporting part, as stated above, and therefore, reference numerals are omitted, in FIG. 4C and FIG. 4D, from parts other than the configurations required for explanation.

The pressing force from the elasticity of the second supporting part 77 and the pressing force of the compressed spring 79 are applied to a center part 80 which is the segment part of the vibrations of the vibrator unit 72, and further applied to a center part 80 which is the segment part of the vibrations of the vibrator unit 71 via shaft 78 and the two driving contacting parts 73, relative to the vibrator unit 71. Therefore, the pressing force from the elasticity of the second supporting part 77 or the pressing force from the compressed spring 79 is distributed evenly in front of and behind (horizontal direction in FIG. 4A) the center of the vibrator units 71 and 72, and the three upper and lower driving contacting parts 73 are pressed against shaft 78.

The three fore-going driving contacting parts 73 are constructed such that at least one performs elliptical motion to move the shaft 78 relatively, as described in detail hereafter.

The vibrator units 71 and 72, described above, are each formed in a rectangular parallelepiped shape and the shaft 78 is formed such that the length of its movement direction is longer than the respective lengths of the vibrators 74 and 75, not only in the basic structures described here, but also in the various variant examples shown below and in the vibration wave linear motor after actual assembly.

In addition, shaft 78 is formed in a linear shape, from hollow or solid rod-shaped component. The shaft 78 in FIG. 4A and FIG. 4B is shown as a solid rod.

Furthermore, this shaft 78 is formed having the same width from one end of the rod-shaped component to the other end, and the cross-section is circular, as shown in FIG. 4A. In other words, the shaft in its entirety is formed into a cylindrical shape as shown in FIG. 4B.

Needless to say, shaft 78 is not limited to a cylindrical shape and, although this is not illustrated in particular, the shaft can be a column having a triangular, rectangular, and other polygonal-shaped cross-section, according to the variant examples of the relative driving contacting part.

Additionally, the three driving contacting parts 73 which are pressured against this shaft 78 are arranged along the movement direction of shaft 78. The contacting parts of these driving contacting parts 73 to the shaft 78 have a U-shaped or V-shaped cross-section (U-shaped in the diagram; V-shaped is described hereafter).

In this way, according to the vibration wave linear motor of the present invention, shaft 78 is driven by two vibrators 74 and 75, and therefore, a significant drive can be applied to the movement of shaft 78.

In addition, as stated above, the first vibrator 74 having at least two or more driving contacting parts and the second vibrator 75 having at least one or more driving contacting parts are shaped such that one lower driving contacting part 73 is placed between the two upper driving contacting parts 73.

Furthermore, because the structure is such that the first vibrator 74 and the second vibrator 75 sandwich shaft 78, which is a long cylindrical driven body, from the top and bottom and are mutually pressed together, and the first vibrator 74, which has two or more driving contacting parts 73, is fixed by the supporting part in a state wherein it cannot rotate horizontally nor vertically, shaft 78 does not tilt up nor down and the driving direction is limited to a certain direction by control from the driving contacting parts 73.

Because the driving direction of shaft 78 is controlled by the driving contacting parts 73 of vibrators 74 or 75, there is no need to provide a separate guiding component for guiding shaft 78 into the driving direction, or in other words, guiding component is unnecessary and therefore, the number of parts can be reduced, contributing to the actualization of miniaturization and reduction of costs.

Still further, as stated above, because pressing force by the elasticity of the second supporting part 77 and the pressing force by the compressed spring 79 is distributed evenly in front of and behind the center of the vibrator units 71 and 72, driving contacting parts 73 can be in contact with shaft 78 in accordance to the movement of shaft 78, and therefore, the drive power of the vibrators 74 and 75 can be applied accurately and efficiently to shaft 78.

On the other hand, even if the shaft is tilted, because the second vibrator 45 which is placed in the lower portion is pressed against the shaft, allowing it to vibrate freely, pressing is performed with a constant stable pressure in adherence to the tilt of shaft 78, and therefore, shaft 78 can be driven smoothly.

In addition, because the surface of the vibrator, which is fixed by the supporting part, opposite to the surface having driving contacting parts is fixed by the supporting part, or in other words, because the vibrator is fixed by the supporting part using one surface of the vibrator, it is possible to fix the vibrators with a simple structure.

FIG. 5A and FIG. 5B are diagrams showing examples of the shape of the cross-section of the contacting surface of the driving contacting parts 73 to shaft 78. FIG. 5C, FIG. 5D, and FIG. 5E are diagrams showing examples of the position of the driving contacting part to the vibrator unit.

FIG. 5A shows the same configuration as that in FIG. 4A, and the contacting part of the driving contacting part 73 to the shaft 78 has a U-shaped (or arc-shaped) cross-section. In addition, FIG. 5B shows an example wherein the contacting part of the driving contacting part 73 to the shaft 78 has a V-shaped cross-section. In either case, the driving contacting part 73 is formed in a concave-shape so that the contacting surface to shaft 78 surrounds the shaft 78 halfway.

In this way, the shape of the driving contacting parts 73 of at least either one of vibrator 74 or vibrator 75 (both in the examples shown in FIG. 4A to FIG. 4D) is set to a shape which controls the movement direction of shaft 78 in a predetermined certain direction (horizontal direction in FIG. 4A and FIG. 4c, and depth direction in FIG. 4B and FIG. 4D), or in other words, a shape which guides in a predetermined certain direction.

Although the driving contacting parts 73 for both upper and lower vibrators 74 and 75 are formed with a U-shaped or V-shaped cross-section which wraps around shaft 78 in FIG. 5A and FIG. 5B, it is actually possible to guide shaft 78 even with a structure wherein the driving contacting parts 73 of only one of either vibrators are formed to wrap around shaft 78.

In addition, FIG. 5C is the same placement configuration of the driving contacting parts 73 as in FIG. 4A and FIG. 4C, and in other words, in this configuration, at one driving contacting part 73 provided on the lower vibrator 75 is placed opposite between the plural driving contacting parts 73 provided on the upper vibrator 74.

Seen in its entirety, it is clear that the fore-going configuration is symmetrical to line 81 which passes through a center part 80 which is the segment part of the vibrations of both vibrator units 71 and 72, described above, of both vibrators 74 and 75.

In addition, FIG. 5D and FIG. 5E show a configuration wherein, in terms of placement, both upper and lower vibrators 74 and 75 comprise two driving contacting parts 73. In this case, as well, the configuration is symmetrical to line 81 which passes through the center part 80 which is the segment part of the vibrations of both vibrator units 71 and 72. In addition, this configuration is also symmetrical to the center axis 82 of shaft 78, illustration of which has been omitted.

In any case, it is preferable that the vibrators 74 and 75 are structured to be, at least, symmetrical to line 81 which passes through the center part 80 which is the segment part of the vibrations of both vibrator units 71 and 72, or structured to be symmetrical to the center axis 82 of shaft 78.

Driving contacting parts 73 shown in FIG. 5A to FIG. 5E are composed of components separate from vibrator unit 71 or 72 and are structured to become integrated with the vibrator unit 71 or 72 during assembly through an adhesive.

Here, the configuration of the vibrator unit 71 (or 72; the same hereinafter) of the vibration wave linear motor according to the present embodiment is explained.

FIG. 6A is a front view of the vibrator unit 71 of the vibration wave linear motor; FIG. 6B is a side view thereof; FIG. 6C is a diagram showing the positioning of piezoelectric sheets and electrodes of the vibrator unit 71 shown in FIG. 6A and FIG. 6B; and FIG. 6D and FIG. 6E are diagrams showing two examples of other structures of the vibrator unit.

As shown in FIG. 6A and FIG. 6B, the vibrator unit 71 comprises: a piezoelectric sheet layer 87 composed of stacked piezoelectric sheets 86; and an elastic sheet layer 89 composed of elastic sheets 88 stacked therebelow.

Insulation sheets 91 are respectively attached to the top surface of piezoelectric sheet layer 87 and the bottom surface of elastic sheet layer 89. This insulation sheet 91 can utilize the same material as elastic sheet 88 which is originally an insulation material.

In addition, the driving contacting parts 73 or linked driving contacting parts 85 shown in FIG. 4 and FIG. 5 are formed in close contact to respective outside surfaces of either one of the insulation sheets 91.

The piezoelectric sheet layer 87 of the vibrator unit 71 configures a piezoelectric part mainly for providing a forcible vibration, whereas the elastic sheet layer 89 configures an excitation part for exciting particular vibration mode in accordance with the piezoelectric part.

However, if desired vibration mode can be excited with only the piezoelectric part, the excitation part is not necessarily required.

The piezoelectric sheets 86 forming piezoelectric sheet layer 87 and the elastic sheets 88 forming elastic sheet layer 89 only differ in regards to whether or not an internal electrode process shown in FIG. 6C has been performed and are originally thin rectangular sheet components made out of the same material, such as PZT (titanic acid lead zirconate), for example. Specifically, each sheet is, for example, 10 mm in length, 2.5 mm in width, and 80 μm in height (thickness in the stacking direction).

As the PZT material used in this embodiment, a hard material having a Qm value as large as 2000 is selected and used. The same material is used also for the elastic sheet.

In addition, the insulation sheets 91 which sandwich piezoelectric sheet layer 87 and elastic sheet layer 89 are composed of the same PZT material, with a thickness of 40 μm.

Although these insulation sheets are composed of the same material as that of the piezoelectric sheets, electrodes are not provided thereon. Therefore, the insulation sheets are not polarized, have no piezoelectricity, and therefore, have, in effect, characteristics as an insulation material.

The piezoelectric sheets 86 of the piezoelectric sheet layer 87 are configured by two types of sheet-state piezoelectric elements differing only in the electrode patterns for which the internal electrode process had been performed.

One of the two types of the piezoelectric sheets 86 is a piezoelectric sheet 86m partitioned into right and left portions, on which A+ internal electrode foil 94 and B− internal electrode foil 95 are formed on almost the entire surface, as shown in FIG. 6C.

Terminals 94-1 and 95-1, which are for the purpose of making external connections, are formed respectively on the A+ internal electrode foil 94 and the B− internal electrode foil 95, above, to protrude toward one side of the piezoelectric sheet 86m in positions close to both right and left ends.

The other type is a piezoelectric sheet 86n similarly partitioned into right and left portions, on which A− internal electrode foil 96 and B+ internal electrode foil 97 are formed almost on the entire surface.

Terminals 96-1 and 97-1, which are for the purpose of making external connections, are formed respectively on the A− internal electrode foil 96 and the B+ internal electrode foil 97, above, to protrude toward one side of the piezoelectric sheet 86n, which is the same as that of sheet 86m, in positions close to the respective centers of the right and the left portions.

Silver-palladium alloy or silver is used as the electrode material for the above-described internal electrode foils. The electrode foils are formed to have a thickness of 4 μm by vapor deposition and photolithography technique, for example.

In the present embodiment, the piezoelectric sheet layer 87 is configured by alternately stacking these two types of piezoelectric sheets 86m and 86n into a sheet layer of a total of 48 sheets composed of 24 sheets respectively.

In this way, in a middle portion excluding the topmost and the bottommost portions, internal electrodes are configured for applying voltages having reverse potentials to both of a piezoelectric sheet 86 (86m or 86n) on which one internal electrode foil is formed and a piezoelectric sheet 86 (86n or 86m) to which the internal electrode foils themselves contact.

In addition, the terminals 94-1, 95-1, 96-1, and 97-1 for external connections, formed to protrude toward one side of the piezoelectric sheet 86 (86m and 86n) from the fore-going A+ internal electrode foil 94, A− internal electrode foil 96, B+ internal electrode foil 97, and B− internal electrode foil 95, respectively, are connected respectively to an A+ electrode connecting external terminal 98, an A− electrode connecting external terminal 99, a B+ electrode connecting external terminal 101, and a B− electrode connecting external terminal 102, which are made of baking silver, on one side surface of the vibrator unit 71 shown in FIG. 6A.

The A+ electrode connecting external terminal 98 and the A− electrode connecting external terminal 99 are configured as A phase electrodes, whereas the B+ electrode connecting external terminal 101 and the B− electrode connecting external terminal 102 are configured as B phase electrodes.

In this case, the A− electrode connecting external terminal 99 and the B− electrode connecting external terminal 102 are configured to connect to A phase and B phase grounds (GNDs), respectively. Therefore, in this case, these terminals can be connected to the same lead wire and the like and configured to have the same electric potential.

A voltage is applied from a driving circuit, which is not particularly illustrated, to the piezoelectric sheet layer 87 via these A phase and B phase electrode connecting external terminals, whereby the vibrator unit 71 generates an ultrasonic elliptical vibration, described hereafter.

Vibrator unit 71 according to the present embodiment is configured, for example, to be 10 mm in the long-side direction, 2 mm in the short-side direction, and 2.5 mm in height.

In this vibrator unit 71, a pin component attachment hole 103 is formed almost in the middle of the A phase and B phase electrodes, namely, the position of the center part 80 which is the segment part of the vibration shown in FIG. 4A, FIG. 4B, and FIG. 5C to FIG. 5E. This pin component attachment hole 103 will be described later.

In addition, the piezoelectric unit is not necessarily limited to the piezoelectric sheet layer 87 and can be a configuration such as the following: In FIG. 6D, the piezoelectric unit comprising piezoelectric parts 105 formed by stacked layer piezoelectric parts or piezoelectric elements, a vibrator unit principal part 106 composed of brass, for example, and vibrator unit components 107, are adhered and linked to form a vibrator unit. The vibrator unit principal part 106 and vibrator unit components 107 form the excitation unit.

Furthermore, FIG. 6E shows a configuration wherein thin single board piezoelectric parts 109 are affixed to a rectangular elastic part 108 made of brass components, for example. The elastic part 108 forms the excitation unit. Adhesion of these components by applying sufficient pressure when affixing these components is vital in increasing vibration transmission efficiency.

FIG. 7A and FIG. 7B are perspective views schematically explaining ultrasonic elliptical vibrations of the vibrator unit 71 of the vibration wave linear motor 70 that is vibration-driven by applying voltage to electrodes in the configuration described above. FIG. 7C is a diagram showing the secondary flexural vibration in FIG. 7B, in a simplified manner, through only the contour of the vibrator.

First, if an alternating current voltage having the same phase in the neighborhood of the resonance frequency is applied to A phase electrodes 98 and 99 and B phase electrodes 101 and 102 of the vibrator unit 71 shown in FIG. 6A, a primary longitudinal vibration comprising a stationary position 111 and a resonance longitudinal vibration position 112 is excited in the vibrator unit 71. In this case, the vibrator unit 71 expands and contracts in the long-side direction, and the vertical and horizontal dimensions of the center part also expand and contract.

In addition, if an alternating current voltage having a reverse phase in the neighborhood of the resonance frequency is applied to A phase electrodes 98 and 99 and B phase electrodes 101 and 102, a secondary flexural vibration comprising a stationary position 113 and a resonance flexural vibration position 114 is excited in the vibrator unit 71.

These vibrations were predicted through computer analysis implementing a finite element method, and the results of actual ultrasonic vibration measurement proved these predictions.

In FIG. 7C, aside from a stationary position 113 and a resonance flexural vibration position 114, the operation of the two driving contacting parts when the configuration comprises driving contacting parts 73-1 and 73-2 arranged in the vibrator unit 71, shown in FIG. 4B, is shown in the upper portion. In addition, although this has not been shown in diagrams up until now, the lower potion shows the operation of the two driving contacting parts when arranged on both ends of the vibrator unit of the two driving contacting parts in the long-side direction.

In this way, in order to transfer motive energy from the vibrator to the driven component (shaft) efficiently, it is preferable that the driving contacting part is arranged and fixed in a position wherein the vibration of the vibrator in the direction opposite of the driven component (shaft) is the highest or in close proximity thereto.

Furthermore, in FIG. 7A and FIG. 7B, a pin component 115 which is attached to the pin component attachment hole 103, shown in FIG. 6A, FIG. 6D and FIG. 6E and formed in the position of the center part 80 which is the segment part (the location of the segment wherein vibration is minimal) of the vibration shown in FIG. 7C, is shown.

In the present embodiment, the resonant frequency of the secondary flexion vibration is designed to be lower than that of the primary longitudinal vibration by several percent (preferably 3 percent or so). With a configuration such as this, the output characteristic as the vibration wave linear motor can be significantly improved as will be described later.

Next, by applying an alternating current voltage having a phase different by $\pi/2$ in the neighborhood of the resonance frequency to the A phase electrodes 98 and 99 and the B phase electrodes 101 and 102 of the vibrator unit 71, an elliptical vibration can be observed in the positions of the two driving contacting parts 73 placed on both ends in the long-side direction of the vibrator unit 71, shown in FIG. 7C, and the positions of the two driving contacting parts 73 placed roughly in the middle of the end part and the center of the vibrator unit 72, shown in FIG. 7C.

In this case, the direction of the rotation of the elliptical vibration caused by ultrasonic vibration in the positions of the driving contacting parts 73 arranged on the bottom surface of the vibrator unit 71, and that of the rotation of the elliptical vibration caused by ultrasonic vibration in the positions of the driving contacting parts 73 arranged on the top surface of the vibrator unit 72 are reversed (refer to FIG. 8).

FIG. 8A and FIG. 8B schematically show the elliptical vibrations of the driving contacting parts of the vibrator when the alternating current voltage having phase which differs by $\pi/2$ in the neighborhood of the resonance frequency is applied.

Although the position of the driving contacting parts 73 of the linked driving contacting parts 85 shown in FIG. 8A and FIG. 8B differ from the upper and lower portions, they are indicated by the same number, as linked driving contacting parts 85. In addition, even when driving contacting parts 73 are individual driving contacting parts, the movement of the elliptical vibration explained below is the same.

FIG. 8A shows operations performed when the phase of the alternating current voltage applied to the A phase electrodes 98 and 99 is ahead by $\pi/2$ of the phase of the alternating current voltage applied to the B phase electrodes 101 and 102. The driving contacting parts 73 on the bottom surface of the vibrator unit 71 rotate in a clockwise direction, whereas the driving contacting parts 73 on the top surface of the vibrator unit 72 rotate in a counter-clockwise direction.

In addition, FIG. 8B shows operations performed when the phase of the alternating current applied to the A phase electrodes 98 and 99 is behind by $\pi/2$ of the phase of the alternating current voltage applied to the B phase electrodes 101 and 102. The driving contacting parts 73 on the bottom surface of the vibrator unit 71 rotate in a counter-clockwise direction, whereas the driving contacting parts 73 on the top surface of the vibrator unit 72 rotate in a clockwise direction.

In this way, it is preferable that the driving contacting parts of the same vibrator are arranged in positions enabling rotation in the same direction, and the driving contacting parts of the vibrator on the opposite side are arranged in positions enabling rotation in the reverse direction. Through this, driving force to shaft 78 can be taken out most efficiently.

Namely, the elliptical vibration synthesized from the longitudinal vibration and the flexural vibration of the vibrator unit 71 and 72, above, acts on the guide shaft 78 via four driving contacting parts 73, and the shaft 78 shown in FIG. 4A and FIG. 4B moves forward and backward in the depth direction of the diagram in FIG. 4B, and the horizontal direction in FIG. 4A, following the guide by the contacting surface of the respective driving contacting parts 73 of the vibrator units 71 and 72. This is the operational principle of the vibration wave linear motor according to the present invention.

In the present embodiment, the piezoelectric units are configured by two places: the A phase wherein the A phase electrodes 98 and 99 are arranged; and the B phase wherein the B phase electrodes 101 and 102 are arranged. However, the piezoelectric units are not limited to two places and can be three places or more, as long as longitudinal vibrations and flexural vibrations can be generated.

In addition, since the vibrator unit 71 has an almost rectangular parallelepiped shape in this embodiment, in this case, the fore-going driving force can be obtained by the longitudinal vibration and the flexion vibration. However, the vibrator may be of another shape as long as the driving force can be obtained by generating the elliptical vibration in the driving contacting parts. In addition, a similar vibration can be obtained by simultaneously exciting one or a plurality of modes of the same frequency or frequencies of an integral multiple.

Furthermore, it is preferable that the driving contacting parts are arranged in arbitrary positions wherein output characteristic of the highest level can be obtained as the vibrator linear motor, namely, positions wherein the ultrasonic elliptical vibration of the highest level of the vibrator units 71 or 72 is generated.

Generally, however, since generating an elliptical vibration becomes the source of drive, elliptical vibration occurs in one or more driving contacting parts. Therefore, the driving contacting parts must be arranged such that the total sum of driving force caused by a vibration that is generated in the positions of all of the driving contacting parts does not become zero.

Furthermore, it is unnecessary for elliptical vibrations to be generated in positions of all of the driving contacting parts. As long as the total sum of driving force from driving contacting parts is not zero and the driving force is in one direction, it is irrelevant whether a single vibration or a vibration in a reverse direction occurs.

In any case, the shaft 78 can be driven with minimal input voltage utilizing the two upper and lower vibrators, by setting the positioning of the electrodes, the timing for the application of alternating current voltage, and the positioning of the driving contacting part accordingly.

Furthermore, in the example of the vibrator unit 71 shown in FIG. 8A and FIG. 8B, the driving contacting part 73 is formed on the both ends of the vibrator unit 71 in the long-side direction, in this case, shaft 78, shown in FIG. 4, which is the driven component, must be formed longer than the largest positioning length between the plurality of driving contacting parts (two in the example in FIG. 8) of the vibrator, in regards to the length of the movement direction thereof.

FIG. 9A, FIG. 9B, FIG. 10A, FIG. 10B, FIG. 11A, FIG. 11B, FIG. 12A, FIG. 12B, FIG. 13A, FIG. 13B, FIG. 14A, and FIG. 14B are, respectively, front views and side views, exploded perspective views, or assembled perspective views of various embodiments based on the basic configuration of the vibration wave linear motor.

In these diagrams, constituent parts which are the same as the configuration shown in FIG. 4A to FIG. 4D are denoted with the same reference numerals.

[First Embodiment]

FIG. 9A and FIG. 9B are diagrams showing the structure of the vibration wave linear motor in a first embodiment. As shown in FIG. 9A and FIG. 9B, in this embodiment, a supporting engagement component 116 with a U-shaped cross-section, fixed respectively by the first supporting part 76 and the second supporting part 77 and placed so as to squeeze vibrators 74 and 75 from both sides, respectively, is provided.

A pin receiving hole 116-1 of this supporting engagement component 116 is engaged to both ends of pin component 115 (also refer to pin component 115 in FIG. 7A and FIG. 7B) inserted into the pin component attachment holes (refer to pin component attachment hole 103 in FIG. 6A, FIG. 6D and FIG. 6E) in vibrators 74 and 75.

In this configuration, vibrator 74 which is held, squeezed from both sides by supporting engagement component 116 with a U-shaped cross-section, cannot rotate in neither horizontal nor vertical direction because pin component 115 and supporting engagement component 116 are attached. However, vibrator 75 can vibrate in a see-saw motion with the supporting engagement component 116 as the fulcrum.

In addition, here, the elasticity of the second supporting part 77 does not directly press vibrator 74, as shown in FIG. 4A and FIG. 4B, but rather contacts the supporting engagement component 116 and, thereby, presses against vibrator 74 via supporting engagement component 116 and pin component 115.

In this way, because vibrator 75 is pressed via the pin component 115 which is inserted into the pin component attachment hole formed on the center part 80, which is the segment part of the vibrations of the vibrator unit 71, the vibrator can be pressed against shaft 78 easily, with a configuration which does not inhibit displacement due to resonance of the vibrator.

In addition, because pressing is performed by the center part of the vibrator which is not displaced, the vibrator can press the shaft evenly, and therefore, stable driving of the shaft 78 is possible. This can also be the when a plurality of driving contacting parts are arranged and pressed to the shaft, as in FIG. 8.

[Second Embodiment]

Figure 10B:
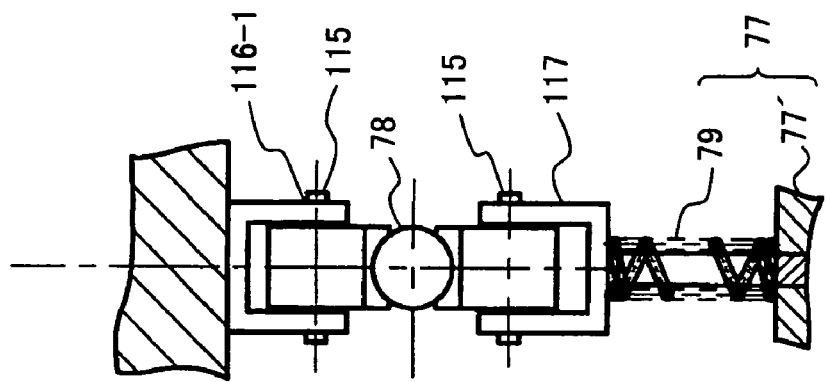
FIG. 10A and FIG. 10B are diagrams showing the structure of the vibration wave linear motor in a second embodiment.
Figure 10A:
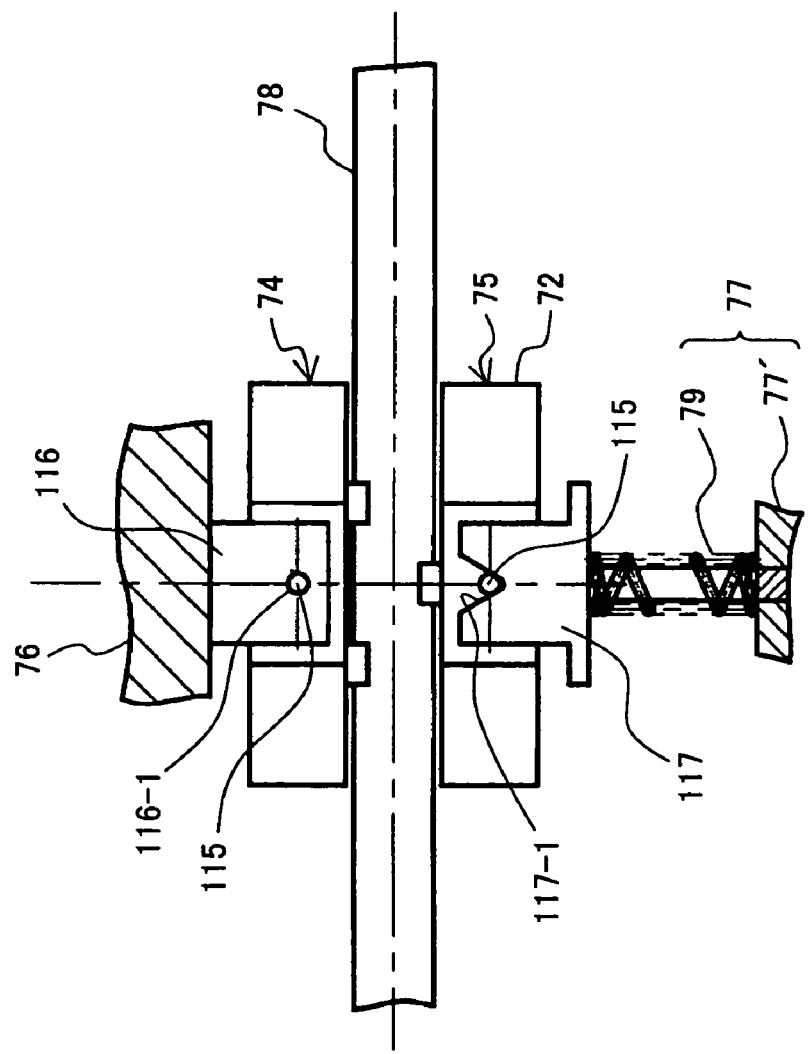

FIG. 10A and FIG. 10B are diagrams showing the structure of the vibration wave linear motor in a second embodiment. The vibration wave linear motor shown in FIG. 10A and FIG. 10B has a configuration wherein both ends of pin component 115 are attached to the pin receiving hole 116-1 of supporting engagement component 116 of vibrator 74. In this way, vibrator 74 cannot rotate in the horizontal direction, as in FIG. 9A and FIG. 9B, and is also prevented from vibrating in the vertical direction in FIG. 10A and FIG. 10B.

In other words, in the present embodiment, vibrator 74 is not directly connected to the first supporting part 76 with the opposite surface of the one having driving contacting part 73 (73-2 and 73-3), as shown in FIG. 4A and FIG. 4B, but is completely fixed by the first supporting part 76 via pin component 115 and supporting engagement component 116, as shown in FIG. 10A and FIG. 10B.

The other vibrator 75 is also not held by pressing from the second supporting part 76 through the opposite surface of the one having driving contacting part 73 (73-1), as shown in FIG. 4A and FIG. 4B, but rather, both ends of pin component 115 (also refer to pin component 115 in FIG. 7A and FIG. 7B) inserted into pin component attachment hole (refer to pin component attachment hole 103 of FIG. 6A, FIG. 6D, and FIG. 6E) of vibrator unit 72 is held from below by the V-shaped valley of a V-shaped engagement part 117-1 formed in place of the pin receiving hole of the supporting engagement component 117 with a U-shaped cross-section which has been placed so as to squeeze from both sides in the same way as with vibrator 74, as shown in FIG. 10A and FIG. 10B.

In addition, because supporting engagement component 117 is pressed upwards by the second supporting part 77 composed of a rigid supporting part 77' and a compressed spring 79, vibrator 75 is configured such that it is pressed against shaft 78 via pin 115 which is fixed in the position of the segment wherein vibration is minimal.

In any of the instances in the fore-going FIG. 9A, FIG. 9B, FIG. 10A and FIG. 10B, because the vibrator is fixed using the pin at the position of the segment wherein vibration is minimal, the vibration mode of the vibrator is not inhibited. Therefore, the driving force of the vibrator can be applied in larger amounts, namely more forcefully, to the shaft which is the driven component. Thus, driving force efficiency is enhanced.

Because vibrator 75 is fixed to enable swinging at will, vibrator 75 can change positions according to the length and movement of shaft 78, and shaft 78 can be driven smoothly.

Furthermore, configurations wherein two vibrators are fixed to positions enabling swinging at will or completely fixed using pins in the position of the segment wherein the vibration of the vibrator is minimal, as described above, is the same as those in the embodiments shown in FIG. 11 to FIG. 14, hereafter.

[Third Embodiment]

FIG. 11A and FIG. 11B are diagrams showing the structure of the vibration wave linear motor in a third embodiment. As shown in FIG. 11A and FIG. 11B, in the vibration wave linear motor of the present embodiment, vibrator 74 is fixed by the first supporting part 76, as in FIG. 10 A and FIG. 10B.

In addition, vibrator 75 is pressed against shaft 78 to enable swinging at will via pin 115 which is fixed to vibrator 75 by pull biasing components such as pulling spring 118 from pin 115 which is fixed to vibrator 74 which is fixed to the first supporting part.

In this way, in the present embodiment, two vibrators 74 and 75 are pressed against shaft 78 using pins 115 fixed thereto, respectively, and therefore, shaft 78 can be pressed with the center positions of vibrators 74 and 75 aligned, and the entire structure can be miniaturized.

[Fourth Embodiment]

FIG. 12A and FIG. 12B are diagrams showing the structure of the vibration wave linear motor in a fourth embodiment. In the vibration wave linear motor shown in FIG. 12A and FIG. 12B, the vibration form of vibrating unit 72 of vibrator 75 which is positioned in the lower portion is only flexural vibration, and there are two segment positions. Furthermore, pins 115 are fixed to the positions of these two segments, respectively.

In addition, vibrator 75 is fixed to supporting part 77' via supporting engagement component 117 by the engagement of these two pins 115 with the V-shaped valley of the V-shaped engagement part 117-1 of the two supporting engagement components 117 fixed to the rigid supporting part 77'.

On the other hand, with regards to vibrator 74 positioned in the upper portion, it is pressed against shaft 78 to enable swinging at will and fixed in position to the first supporting part via compressed spring 79 and one supporting engagement component 117 via pins 115 fixed to vibrator 75.

In this way, in the present embodiment, because vibrator 75 which is positioned in the lower portion is held in two places, vibrator 75 can be fixed such that rotating force in both horizontal direction and vertical direction is not applied, even without fixing pins 115 to the supporting part 77' with adhesive and the like.

[Fifth Embodiment]

FIG. 13A and FIG. 13B are diagrams showing the structure of the vibration wave linear motor in a fifth embodiment. The vibration wave linear motor shown in FIG. 13A and FIG. 13B is the same as that in FIG. 12A and FIG. 12B in that the vibration form of vibrating unit 72 of vibrator 75 which is positioned in the lower portion is only flexural vibration; there are two segment positions; pins 115 are fixed to the positions of these two segments, respectively; and vibrator 75 is fixed to supporting part 77' via supporting engagement component 117 by the engagement of these two pins 115 with the V-shaped valley of the V-shaped engagement part 117-1 of the two supporting engagement components 117 fixed to the rigid supporting part 77'. Points in the present embodiment which differ from the embodiment in FIG. 12A and FIG. 12B are that a loop-shaped string component 119 with little elasticity is strung between pins 115, positioned in two places on vibrator 75, and a pulling spring is strung between the intermediate part of the upper portion of the loop-shaped string component 119 and pin 115 of vibrator 74 which is positioned in the upper portion, thus pressing vibrator 74 to shaft 78.

In this way, in the present embodiment, because pins 115, fixed on vibrators 74 and 75, respectively, are mutually pulled by the loop-shaped string component 119 and the pulling spring 118 and the shaft is pressed, the device is effective in miniaturization.

In addition, rotation force in neither the horizontal direction nor the vertical direction is applied even when the both of vibrators 74 and 75 are not fixed to the supporting part, and shaft 78 can be controlled and lead to a certain direction accurately (horizontal direction in the diagram in FIG. 13A and depth direction in the diagram in FIG. 13B).

With regards to the fore-going first to fifth embodiments, it had been explained that there are two driving contacting parts in one vibrator and one driving contacting part in the other vibrator. However, as shown in FIG. 5D and FIG. 5E in the explanation of the basic structure, both vibrators 74 and 75 can, of course, have two driving contacting parts, respectively.

In this case, the placement position of driving contacting parts 73 should be opposing positions, via shaft 78, as shown in FIG. 5D and FIG. 5E.

In addition, if the respective placement positions of these two driving contacting parts 73 are places wherein the driving force of vibrators 74 or 75 can be applied and within the range of the length of vibrator 74 or 75, they can be any position.

Furthermore, if they are in opposing positions (surfaces) via shaft 78, it is not necessary for individual driving contacting parts 73 to oppose each other as shown in FIG. 5D and FIG. 5E. The placement of the driving contacting parts of one vibrator can be such as that in FIG. 5D, and the placement of the driving contacting parts of the other vibrator can be such as that in FIG. 5E.

By providing two driving contacting parts for each vibrator, driving force can be enhanced. In addition, in comparison with instances where there is only one driving contacting part, stability increases and guidance to the shaft improves, as well. Furthermore, if there are two driving contacting parts on both ends of the vibrator as shown in FIG. 5E, guidance to the shaft improves even further.

As shown in the fore-going first to fifth embodiments, according to the present invention, because at least one vibrator out of a first vibrator which has two or more driving contacting parts and a second vibrator which has one or more driving contacting parts is fixed to a supporting part, and these two vibrators hold a driven component and drive the driven component while guiding the driven component in the drive direction, a guidance component during drive is unnecessary and miniaturization of the entire device is possible.

[Sixth Embodiment]

FIG. 14A is an exploded perspective view showing the structure of the vibration wave linear motor in a sixth embodiment. FIG. 14B is a perspective view showing this vibration wave linear motor in an assembled state. As shown in FIG. 14A and FIG. 14B, vibration wave linear motor 120 first comprises vibrators 74 and 75 comprising the rectangular vibrator units 71 and 72 shown in FIG. 4 to FIG. 13 and a plurality of driving contacting parts 73 (two driving contacting parts, respectively, in FIG. 14 A and FIG. 14B).

Pin components 115 are inserted respectively in the center parts which are the segment parts of the vibrations of these vibrators 74 and 75, and both ends respectively protrude outward from both side surfaces of the vibrators 74 and 75.

Vibration wave linear motor 120 comprises housing 122 which stores vibrators 74 and 75 in its upper and lower portions, prevents movement in the long-side direction (from obliquely lower left to obliquely upper right direction in FIG. 14A and FIG. 14B), and wherein shaft insertion holes 121-1 and 121-2 to which shaft 78 is inserted are formed on both sides in the long-side direction.

Shaft 78 which is inserted through the shaft insertion holes 121-1 and 121-2 is provided between the vibrators 74 and 75 which are stored in the upper portion and lower portion of housing 122.

From the upper portion and lower portion of housing 122, above, pressing engagement components 123-1 and 123-2 are combined to embrace the upper portion and lower portion of housing 122.

Locking pin holes 124-1 and 124-2 are formed respectively in one end part in the long-side direction of pressing engagement components 123-1 and 123-2 (end part in the obliquely upper right direction in FIG. 14A and FIG. 14B), and in correspondence to these locking pin holes, locking pin holes 125-1 and 125-2 are formed respectively in one end part in the long-side direction of the upper portion and lower portion of housing 122.

Joining lock pin 126-1 is inserted into the locking pin hole 124-1 of the upper pressing engagement component 123-1 and the locking pin hole 125-1 in the upper portion of housing 122. The pressing engagement component 123-1 locks on to the upper end part of housing 122, enabling swinging, using this joining lock pin 126-1 as a pivot.

On the other hand, the joining lock pin 126-2 is inserted into the locking pin hole 124-2 of the lower pressing engagement component 123-2 and the locking pin hole 125-2 in the lower portion of housing 122. The pressing engagement component 123-2 locks on to the lower end part of the housing 122, enabling swinging, using this joining lock pin 126-1 as a pivot.

In addition, pressing pin holes 127-1 and 127-2 are formed, respectively, on the other end parts in the long-side direction of the pressing engagement components 123-1 and 123-2 (end parts in the obliquely lower left direction in FIGS. 14A and 14B). Pressing engagement pins 128-1 and 128-2 are inserted, respectively, into these pressing pin holes 127-1 and 127-2.

Stopping grooves 128-1a and 128-1b which are respectively notched along the circumference are formed on both end parts protruding outwards of the pressing engagement pin 128-1, and stopping grooves 128-2a and 128-2b which are respectively notched along the circumference are formed on both end parts protruding outwards of the other pressing engagement pin 128-2.

Although this is not shown clearly in FIG. 14 B, both of the ends of one helical spring 129-1 which has a pulling power is respectively locked on to the stopping groove 128-1a of the front side of the pressing engagement pin 128-1 and the stopping groove 128-2a of the front side of the pressing engagement pin 128-2. Another helical spring 129-2 which has a pulling power is respectively locked on to the stopping groove 128-1b of the back side of the pressing engagement pin 128-1 and the stopping groove 128-2b of the back side of the pressing engagement pin 128-2 (neither can be seen in FIG. 14 B because they are hidden by other components).

In this way, the fore-going pressing engagement component 123-1 presses downward in its entirety with the joining lock pin 126-1 as the pivot, and the engagement component 123-1-1 thereof engages with pin component 115 of the upper vibrator 74 and presses vibrator 74 downward. The lower pressing engagement component 123-2 is pressed upward in its entirety using the joining lock pin 126-2 as the pivot, and the engagement component 123-2-1 thereof engages with pin component 115 of the lower vibrator 75 and presses vibrator 75 upward.

A nut 131 is fixed onto one end part (end part in the obliquely upper right direction in FIG. 14A and FIG. 14B) of the shaft 78 which is pressured and held by the vibrator 74 and vibrator 75. A drive engagement pin 132 is fixed and attached to this nut 131 to be perpendicular to, horizontal to, and in the opposite direction (obliquely upper left direction in FIG. 14A and FIG. 14B) of the axis of shaft 78.

The end of the drive engagement pin 132 which is extended long cannot be seen in FIG. 14B because it is hidden by other components. This drive engagement pin 132 moves according to the operation of shaft 78, in correspondence with the back and forth movement of shaft 78 in the long-side direction by vibrator 74 and vibrator 75.

FIG. 15A is a perspective view explaining a method for linking the vibration wave linear motor 120 and the third movable lens frame 19. FIG. 15B is an enlarged perspective view showing only the linked part. FIG. 15A is a diagram showing the vibration wave-linear motor 46 (120 in FIG. 15A) and the third movable lens frame 19 in FIG. 3.

In addition, FIG. 15A shows a drive engagement pin 132 which is provided to nut 131 on the end part of shaft 78 and extends in an obliquely upper left direction, detached from the nut 131 in its extending direction to make it easily comprehensible.

FIG. 16A is a diagram showing FIG. 15B when viewed in the direction of an arrow c, and FIG. 16B is a cross-sectional view of FIG. 15B when taken along an arrow line A–A'. FIG. 16 B also shows a cross-section of the drive engagement pin 132, as well as shaft 78 and nut 131.

As shown in FIG. 15A, the third movable lens frame 19 is configured by the lens frame unit 133 holding the third movable lens unit 12, a shaft bearing part 53-3, and an engaging protruding part 134 provided to protrude downward from the shaft bearing part 53-3.

A long hole 135, which extends in a direction parallel with the direction where the lens frame unit 133 moves along the optical axis 02, is provided almost in a central portion of the engaging protruding part 134.

In the long hole 135 (also refer to FIG. 16A and FIG. 16B), a board spring 136, which presses the portion (the long hole 135 of the engaging protruding part 134) wherein the drive engagement pin 132 for taking out a movement output comes into contact with the third movable lens frame 19, is engaged from the opposite side in this diagram.

Board spring 136 is configured by a flat main part 136-1, a locking part 136-2 which is bent in two stages toward the front and then upward from the bottom of the main part 136-1, and a pressing part 136-3 which is bent toward the front from the left end of the main part 136-1.

The locking part 136-2 of the board spring 136 locks onto the engaging protruding part 134 by wrapping around the bottom of the engaging protruding part 134, where the long hole 135 of the third movable lens frame 19 is formed, from the opposite side and held.

As a result, the main part 136-1 of board spring 136 is in close contact with the aperture on the opposite side of the long hole 135, and the pressing part 136-3 is inserted in a predetermined position within the long hole 135 from the opposite side.

Between the pressing part 136-3 and the left end of the long hole 135, a gap which is only wide enough for the drive engagement pin 132 for taking out a movement output to be inserted is formed.

Between a side surface 133-1 on the opposite side of the lens frame main unit 133 of the third movable lens frame 19 and a surface on the front side of the engaging protruding part 134, a clearance large enough to place only a flexible board connected to the A+ electrode connecting external terminal 98, the A– electrode connecting external terminal 99, the B+ electrode connecting external terminal 101, and the B– electrode connecting external terminal 102 of the vibrator unit 71 and 72 of the vibration wave linear motor 120, shown in FIG. 6, is formed.

When the vibration wave linear motor 120 is arranged in this clearance, the drive engagement pin 132 for taking out a movement output is inserted in the gap formed between the pressing part 136-3 and the left end of the long hole 135, as shown in FIG. 15B.

With this engagement, the movements of the drive engagement pin 132 for taking out a movement output is prohibited from movement in the direction of the second optical axis O2 within the long hole 135, and movement in the direction of the second optical axis of shaft 78 of the vibration wave linear motor 120 whose housing 122, shown in 14B, is placed and fixed to metal frame 23a, shown in FIG. 2 but omitted from FIG. 15A, is transmitted faithfully to the third movable lens frame 19.

On the other hand, play is allowed in the upward and downward movements of the drive engagement pin 132 in the above described engagement. This play absorbs oblique fluctuations in the vertical direction and the like of the vibrator units 71 and 72 and shaft 78, centering on pin component 115 of the vibrator units 71 and 72.

Furthermore, through this, the drive engagement pin 132 for taking out a movement output accurately transmits the direction and the force of the movement of shaft 78 in the direction of the second optical axis O2 to the third movable lens frame 19, as described above. In the meantime, the drive engagement pin 132 absorbs the upward and downward movements of shaft 78, which are influenced by upward and downward movements due to the elliptical vibration and the like of the vibrator units 71 and 72, with the upward and downward movements within the long hole 135 and does not transmit to the third movable lens frame 19.

In this way, in the present embodiment, in the junction between shaft 78 and the third movable lens frame 19, a linked state by the drive engagement pin 132 for taking out a move output is formed, of which one end is fixed to shaft 78 via nut 131 and the other end only abuts on the portion (the long hole 135 of the engaging protruding part 134) on the third movable lens frame 19 with the pressing force of the board spring 136. As a result, the movement force (driving force) of shaft 78 is transmitted to the movement of the third movable lens frame 19.

As described above, the drive engagement pin 132 is a movement driving transmitting means for transmitting the movement driving force of shaft 78 externally (a movement driving mechanism within an electronic appliance, an element to be driven to move within a device) when the vibration wave linear motor 120 is comprised in an electronic appliance, device and the like.

In addition, through linear drive, components such as lens frames which make linear movement can be driven directly, thereby, reducing mechanical loss and actualizing a drive which is high in efficiency.

Furthermore, if a camera lens frame is the driven component, because lens frames, such as focus lens frames, can be driven directly by linear drive, focusing time can be reduced and fast shooting operations by the user can be handled, thereby facilitating the handling of quick shooting operations.

Incidentally, it has been explained that the vibration wave linear motor according to the present embodiment has a relationship wherein shaft 78 and the two vibrators 74 and 75 move relatively, in the fore-going FIG. 4A and FIG. 4B.

If this is explained using FIG. 15A, in the case of FIG. 15A, the third movable lens frame 19 which is linked to shaft 78 via nut 131 and the drive engagement pin 132 is moved by the shaft 78 which moves to the fixed housing 122. For example, the front and back end parts of the movement direction of shaft 78 are held with elastic components which do not interfere with the vibrations of shaft 78, this elastic component is fixed to the metal frame 23a, and the fixed adjoining part with housing 122 is formed on an appropriate area of the third movable lens frame 19.

Then, shaft 78 is placed in a fixed position, the vibrators 74 and 75, namely housing 122, move relative to this shaft 78, and in other words, the third movable lens frame 19 which is fixed and adjoined to housing 122 moves.

Structures such as this are possible, hence the explanation that shaft 78 and the two vibrators 74 and 75 have a relationship wherein movements are relative.

What is claimed is:

1. A vibration wave linear motor comprising:
   a driven component;
   a first vibrator having two or more driving contacting parts for driving the driven component in a certain predetermined direction;
   a second vibrator having one or more driving contacting parts for driving the driven component in the same direction as the drive by the first vibrator;
   a first supporting part for fixing and holding either one of the first or second vibrators;
   a second supporting part for holding the other of either the first or second vibrator such that swinging is possible; and
   a pressing component for pressing the first or second vibrator which is held by the second supporting part, such as to enable swinging, to the driven component by pressing either one or both of the first and second vibrators directly and in a direction perpendicular to the opposing surfaces of the vibrators and the driven component,
   wherein the driving contacting parts of at least either one of the first or second vibrator has a shape for guiding the driven component in the certain predetermined direction in accordance with the shape of this driven component.

2. The vibration wave linear motor according to claim 1 wherein one or more the driving contacting parts of the second vibrator is placed in an opposing position between two or more the driving contacting parts of the first vibrator.

3. The vibration wave linear motor according to claim 1 wherein the surface opposing the one having the driving contacting parts of the first vibrator are fixed to the first supporting part.

4. The vibration wave linear motor according to claim 1 wherein the second supporting part positions, fixes and holds the first or second vibrator, held such that swinging is possible, in a direction along the certain predetermined direction.

5. The vibration wave linear motor according to claim 1 wherein the opposite surface of the one having the driving contacting parts of the second vibrator is positioned and fixed, such that swinging is possible in accordance to the tilt of the driven body, by the second supporting part.

6. The vibration wave linear motor according to claim 1 wherein the first vibrator is fixed to the first supporting part via a pin fixed onto a position of a segment wherein vibration is minimal.

7. The vibration wave linear motor according to claim 1 wherein the second vibrator is pressed against the driven component via a pin fixed onto a position of a segment wherein vibration is minimal.

8. The vibration wave linear motor according to claim 1 wherein the second vibrator is held such that swinging is possible in accordance to the tilt of the driven body, by the second supporting part, via a pin fixed onto a position of a segment wherein vibration is minimal.

9. The vibration wave linear motor according to any one of claim 6, claim 7, or claim 8 wherein a pull biasing component is tacked across between a pin provided in the position of a segment of the first vibrator and a pin provided in the position of a segment of the second vibrator, and the first and second vibrators are pressed against the driven component.

10. The vibration wave linear motor according to claim 6 wherein the first vibrator has two positions of segments wherein vibration is minimal and is supported by the first supporting part by pins fixed respectively in the positions of the segments.

11. The vibration wave linear motor according to claim 10 wherein the first and second vibrators are pressed against the driven component by pull biasing component which engages with a pin provided in a position of a segment of the first vibrator and a component placed across pins provided in the positions of two segments of the second vibrator.

12. The vibration wave linear motor according to claim 1 wherein both the first and second vibrators comprise the driving contacting parts respectively in two opposing positions via the driven component.

13. A lens device to which the vibration wave linear motor according to claim 1 is installed as a driving source of a lens for focusing.

* * * * *